(12) United States Patent
Zahdeh et al.

(10) Patent No.: US 12,227,401 B2
(45) Date of Patent: Feb. 18, 2025

(54) AUTONOMOUS TRANSPORT VEHICLE WITH POWER MANAGEMENT

(71) Applicant: Symbotic LLC, Wilmington, MA (US)

(72) Inventors: Akram Zahdeh, Wilmington, MA (US); David Gratiano, Wilmington, MA (US); Alan Phillips, Wilmington, MA (US); Stephen Debaryshe, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 308 days.

(21) Appl. No.: 17/804,039

(22) Filed: May 25, 2022

(65) Prior Publication Data

US 2023/0107709 A1    Apr. 6, 2023

Related U.S. Application Data

(60) Provisional application No. 63/251,398, filed on Oct. 1, 2021.

(51) Int. Cl.
| | |
|---|---|
| *B66F 9/06* | (2006.01) |
| *B25J 5/00* | (2006.01) |
| *B25J 19/00* | (2006.01) |
| *B60L 58/13* | (2019.01) |
| *B66F 9/075* | (2006.01) |

(52) U.S. Cl.
CPC .............. *B66F 9/063* (2013.01); *B25J 5/007* (2013.01); *B25J 19/005* (2013.01); *B60L 58/13* (2019.02); *B66F 9/07513* (2013.01); *B60L 2200/36* (2013.01); *B60L 2240/547* (2013.01)

(58) Field of Classification Search
CPC ............ B66F 9/063; B25J 5/007; B60L 58/13
USPC .......................................................... 701/50
See application file for complete search history.

(56) References Cited

U.S. PATENT DOCUMENTS

| | | | |
|---|---|---|---|
| 2010/0102625 A1* | 4/2010 | Karimi .................... | B60L 50/61 307/9.1 |
| 2022/0185493 A1* | 6/2022 | Chen ...................... | H02J 7/0048 |

* cited by examiner

*Primary Examiner* — Todd Melton
*Assistant Examiner* — Vincent Feng
(74) *Attorney, Agent, or Firm* — Perman & Green, LLP

(57) ABSTRACT

An autonomous guided vehicle includes a chassis with a power supply and powered sections that are connected to the chassis and powered by the power supply. The powered sections include a drive section, a payload handling section, and a peripheral electronics section. A controller of the vehicle includes a comprehensive power management section communicably connected to the power supply so as to monitor a charge level of the power supply. The comprehensive power management section is connected to the drive section, the payload handling section, and the peripheral electronics section respectively powering the drive section, the payload handling section, and the peripheral electronics section from the power supply. The comprehensive power management section manages power consumption of branch circuits, of the powered sections, based on a demand level of each branch circuit relative to the charge level available from the power supply.

20 Claims, 26 Drawing Sheets

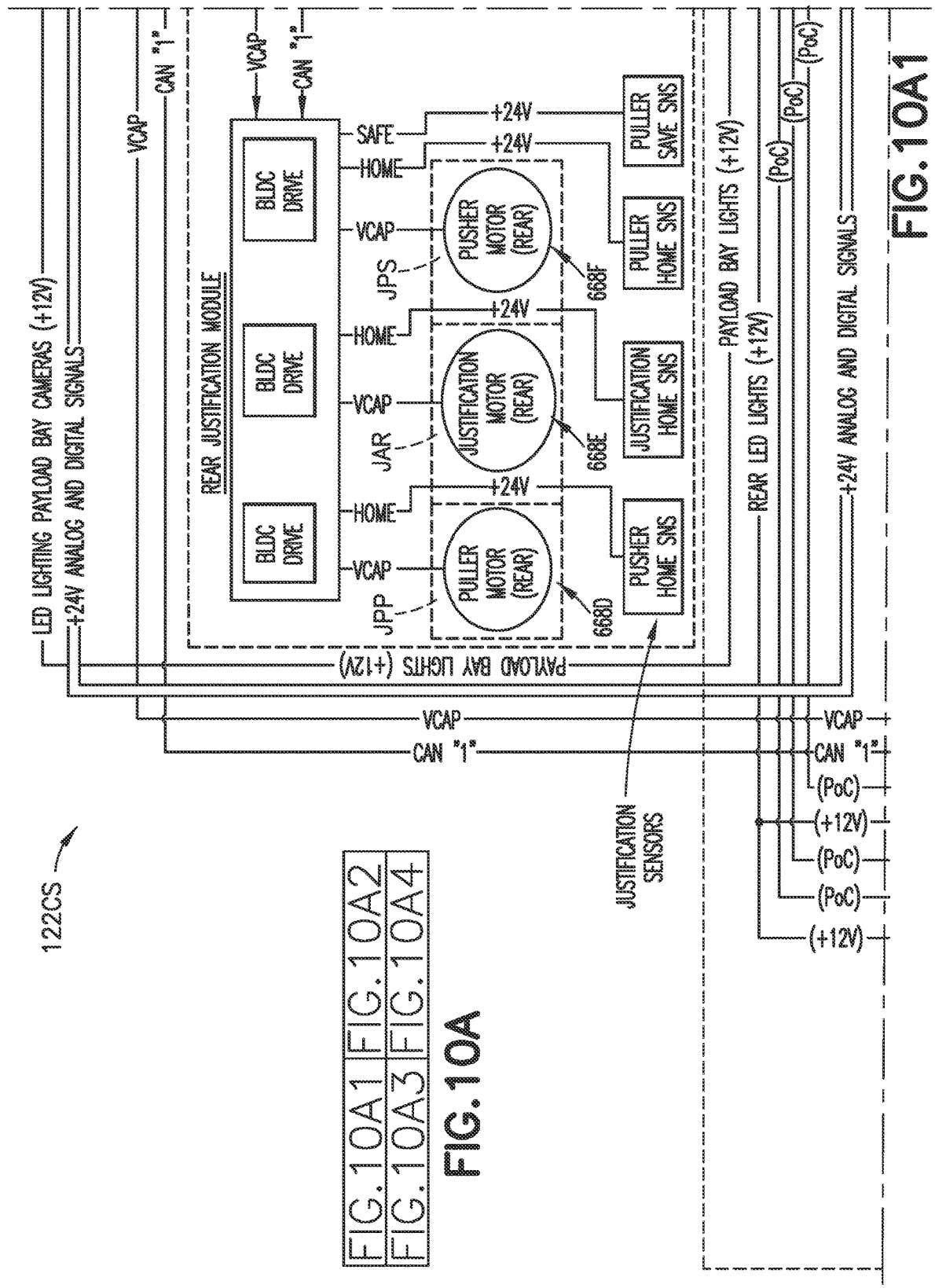

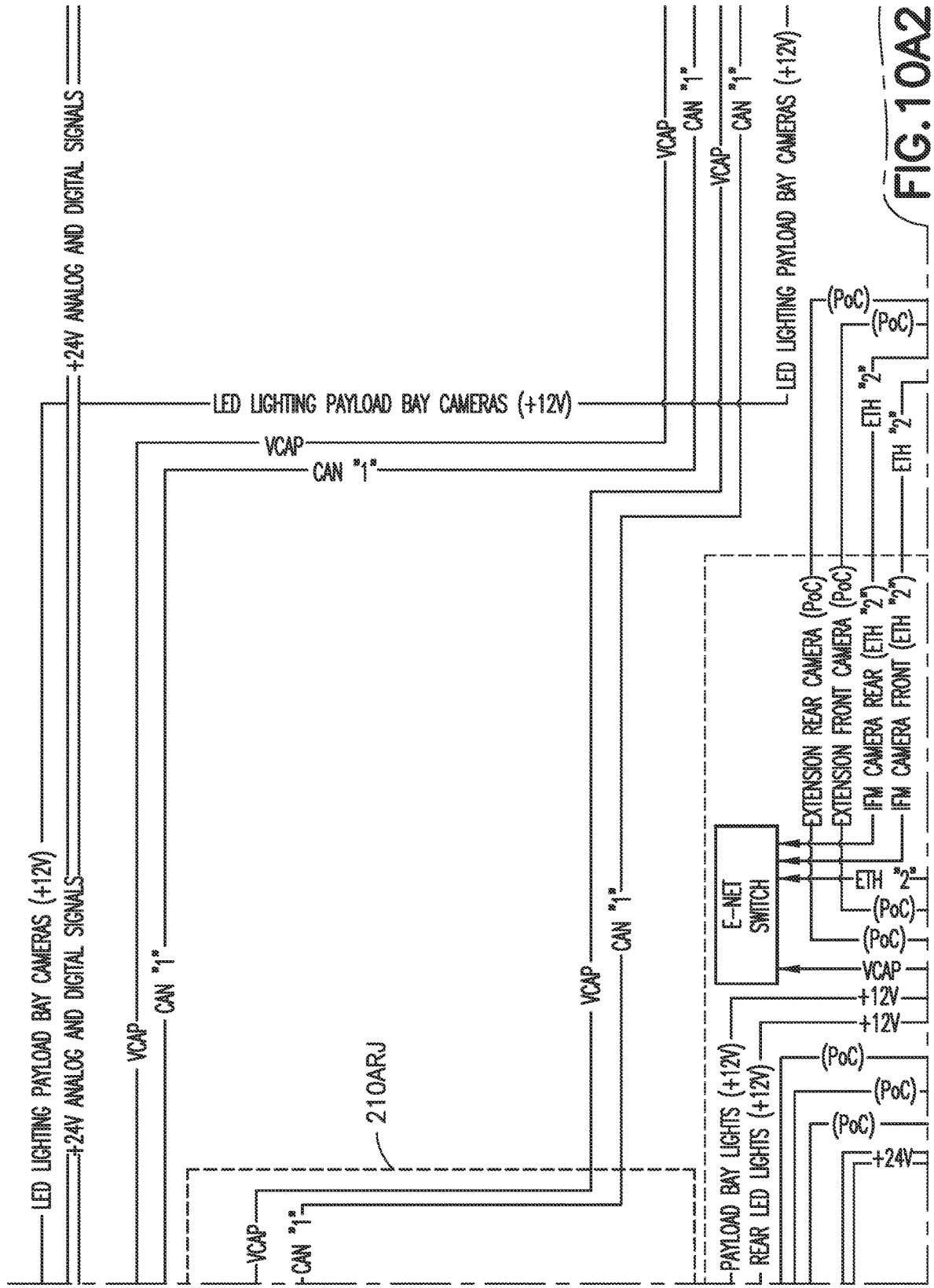

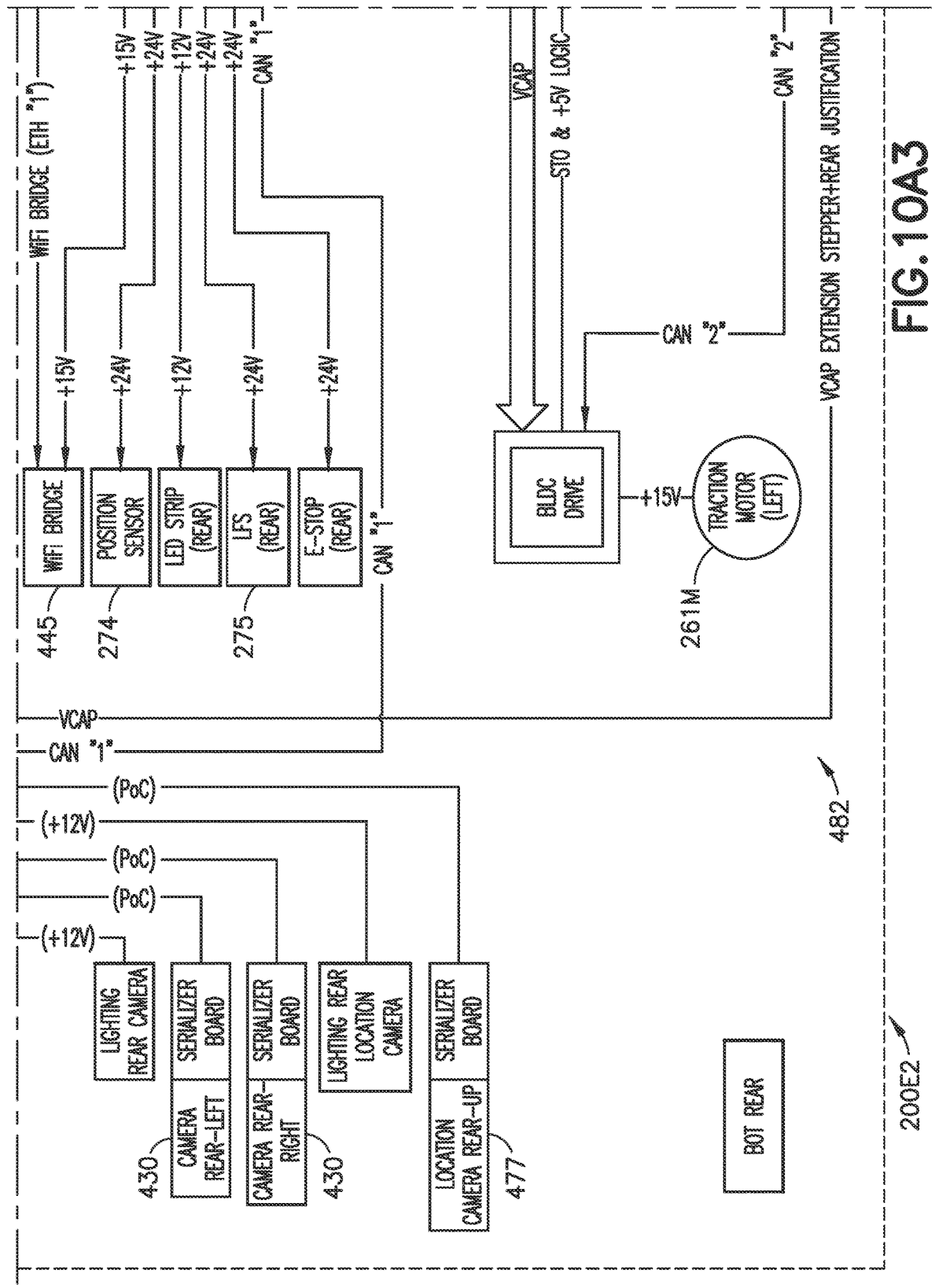
FIG. 10A3

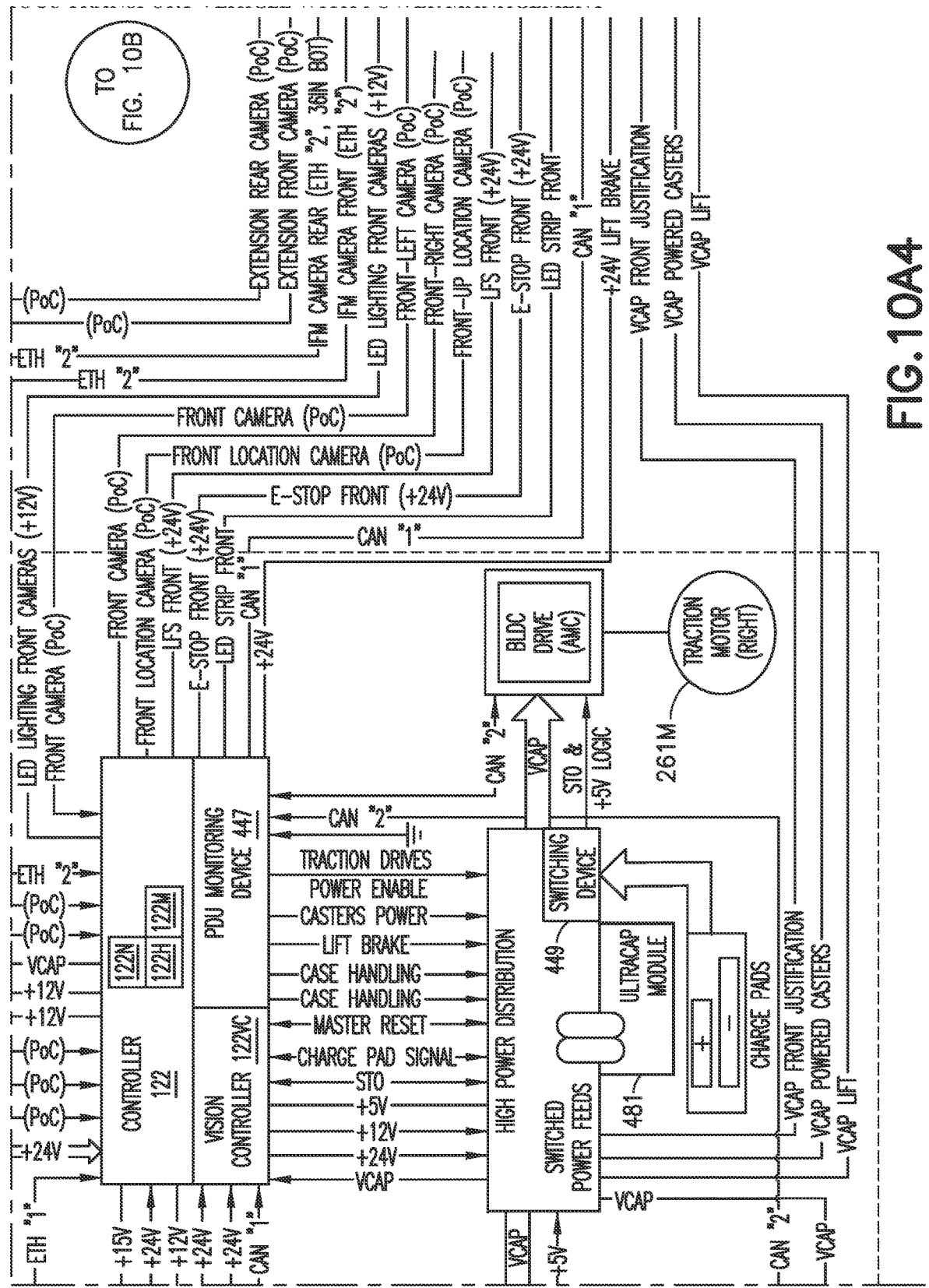
FIG. 10A4

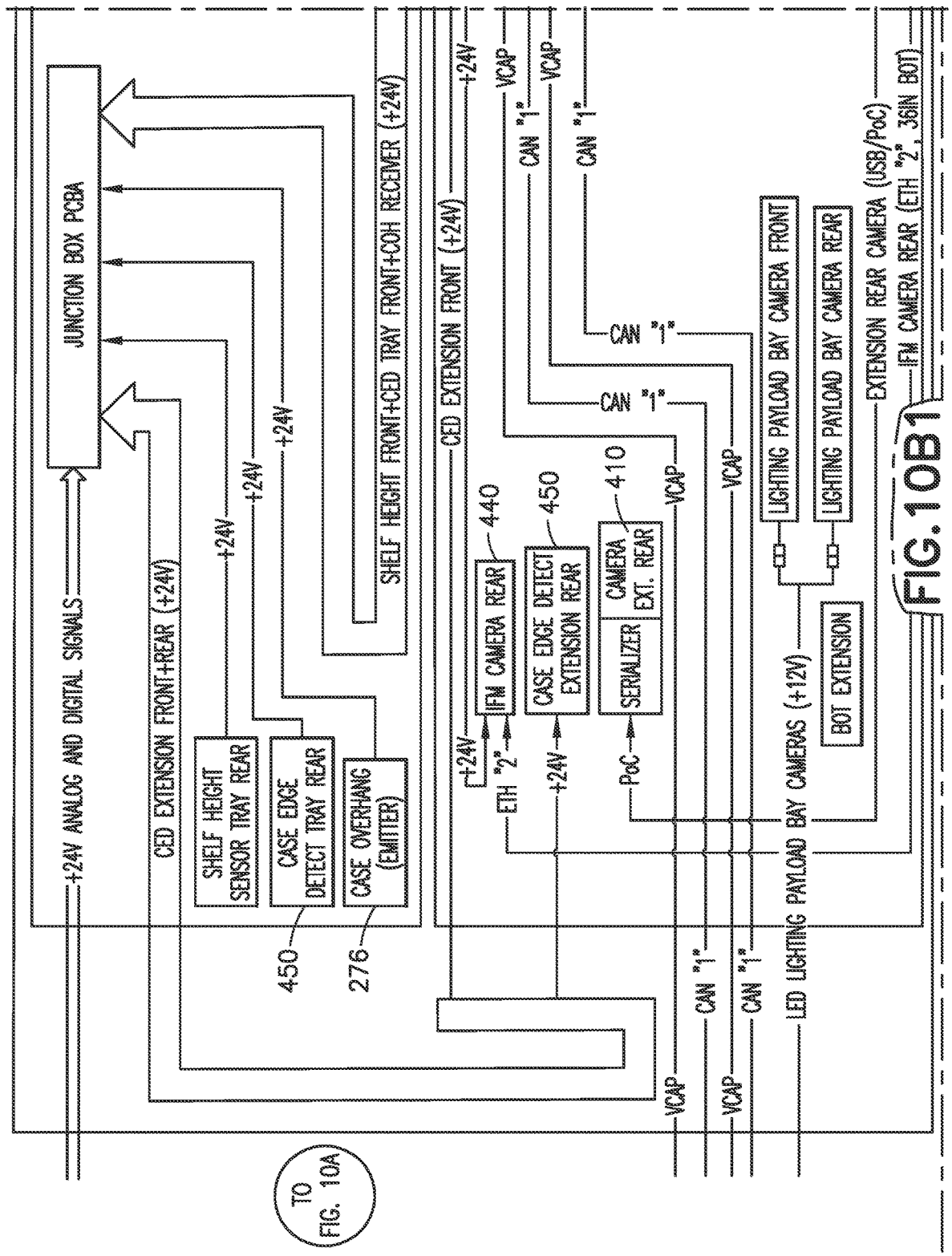

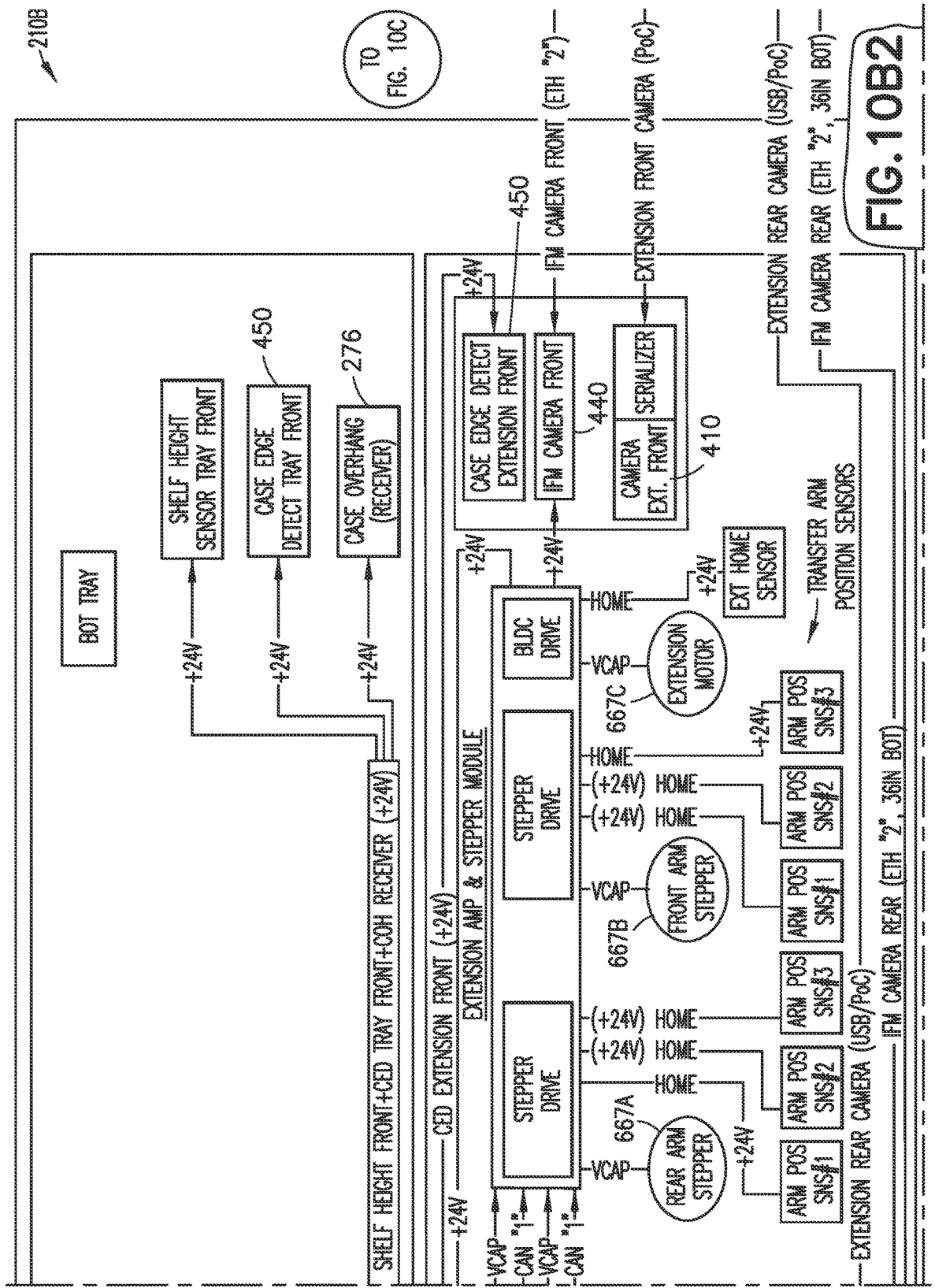

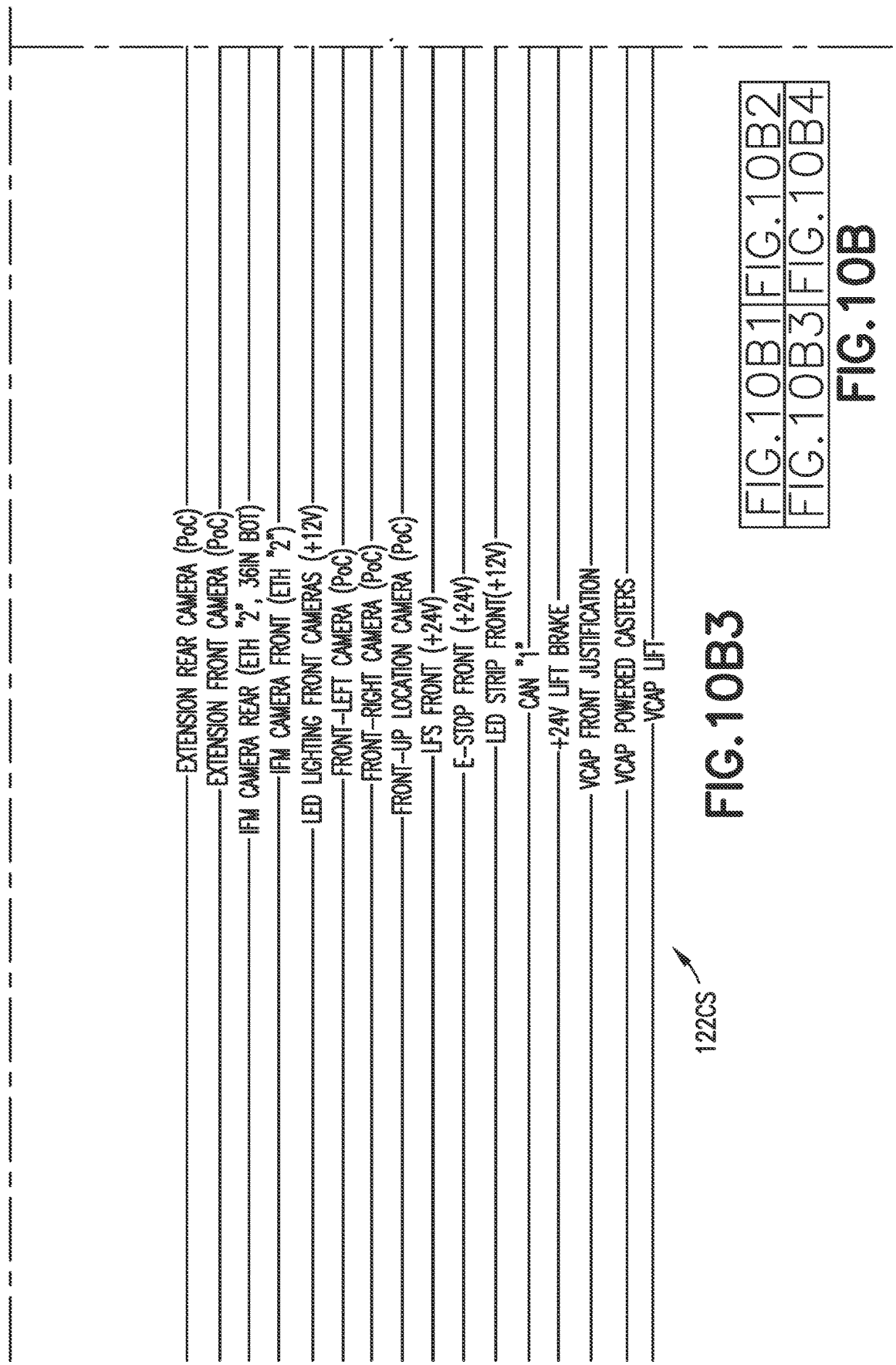

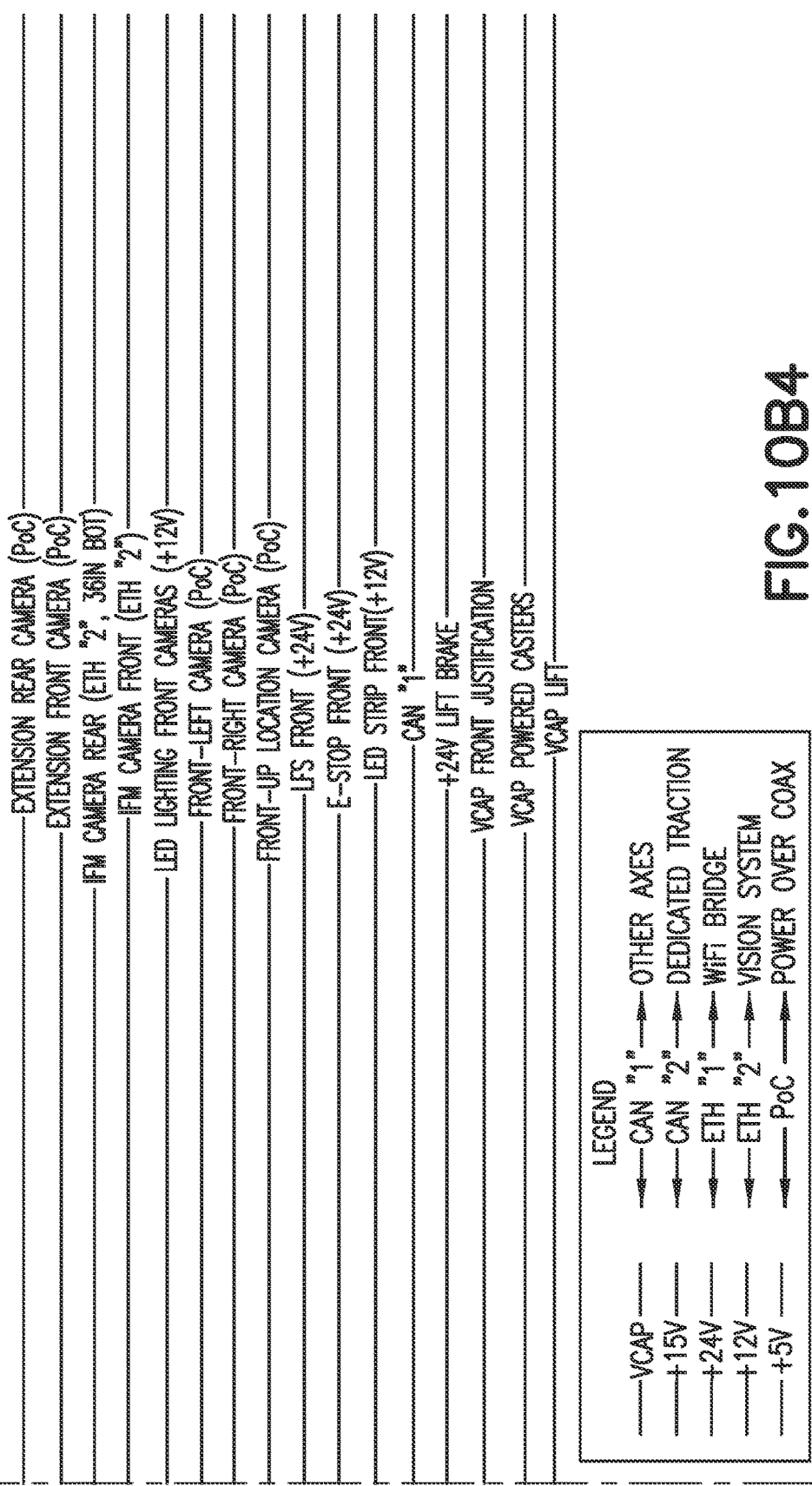

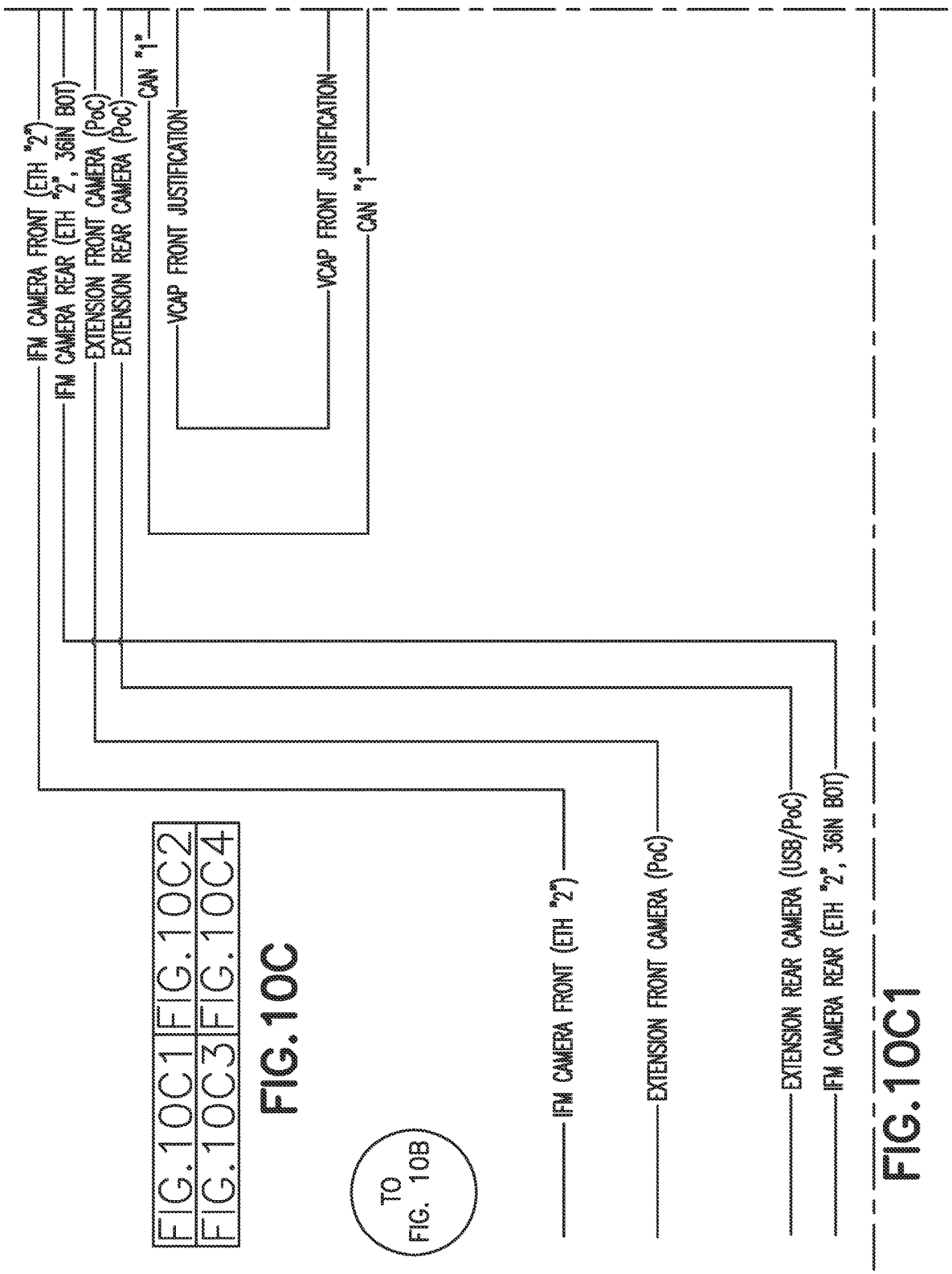

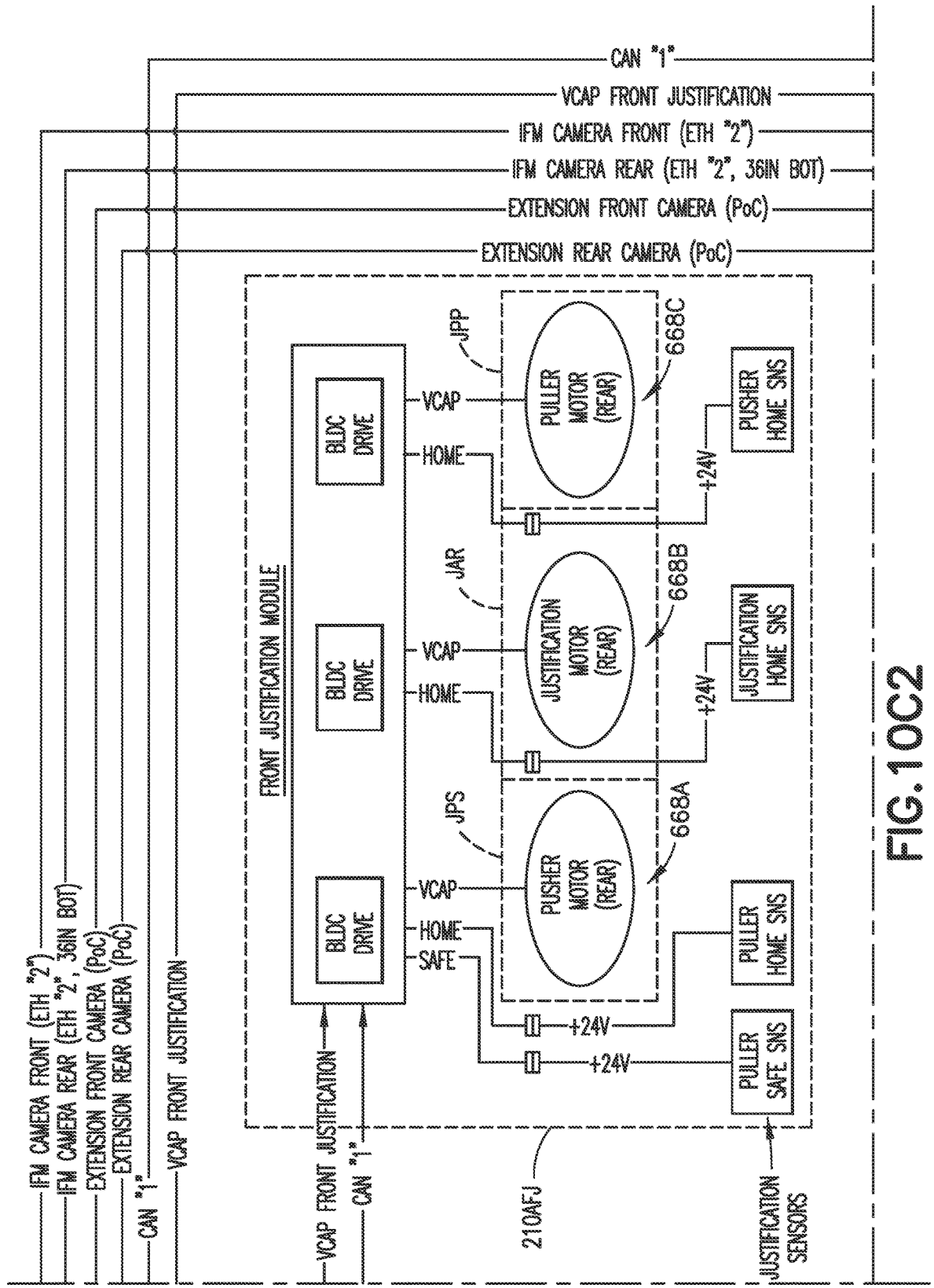
FIG. 10C2

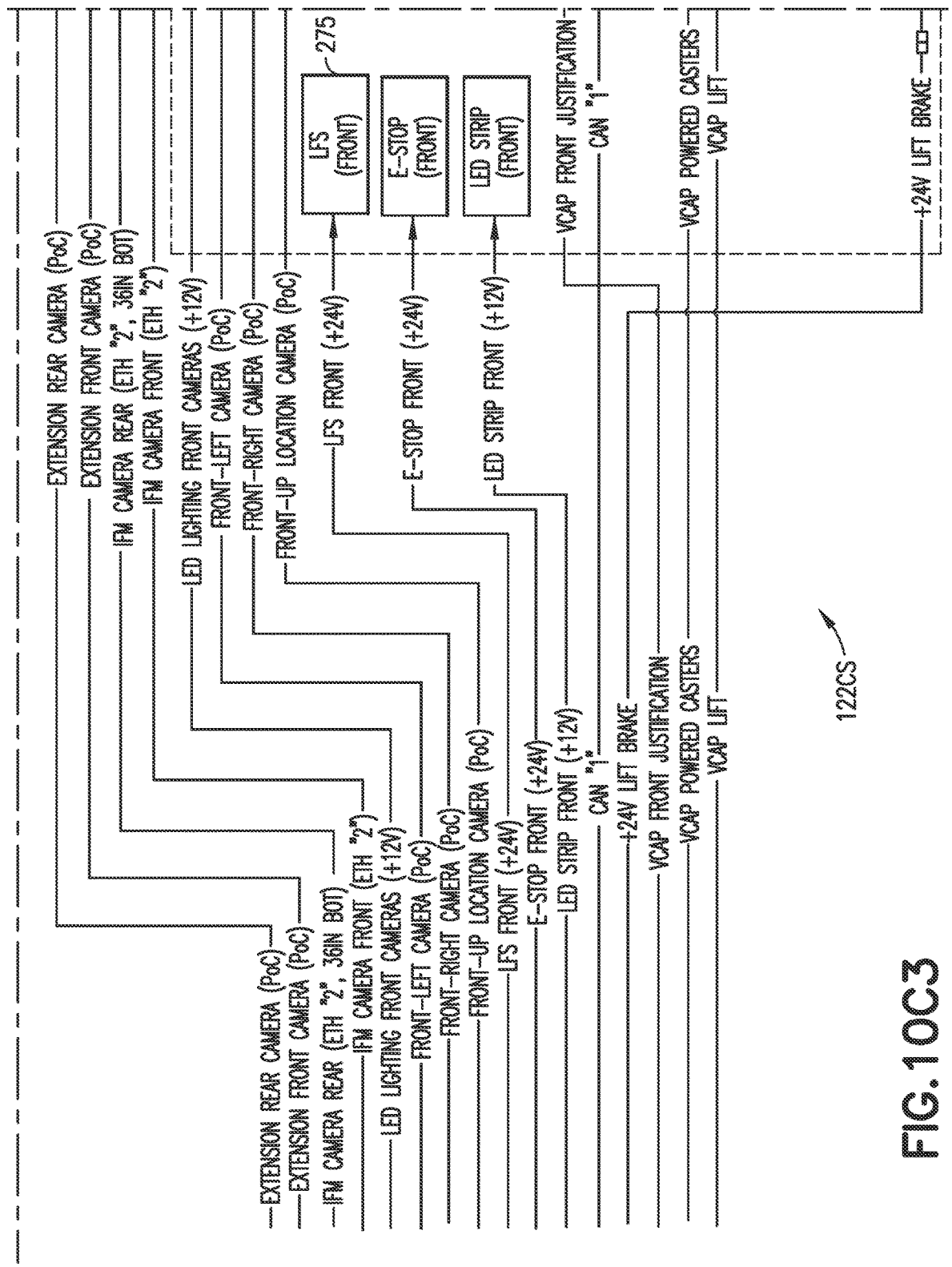
FIG. 10C3

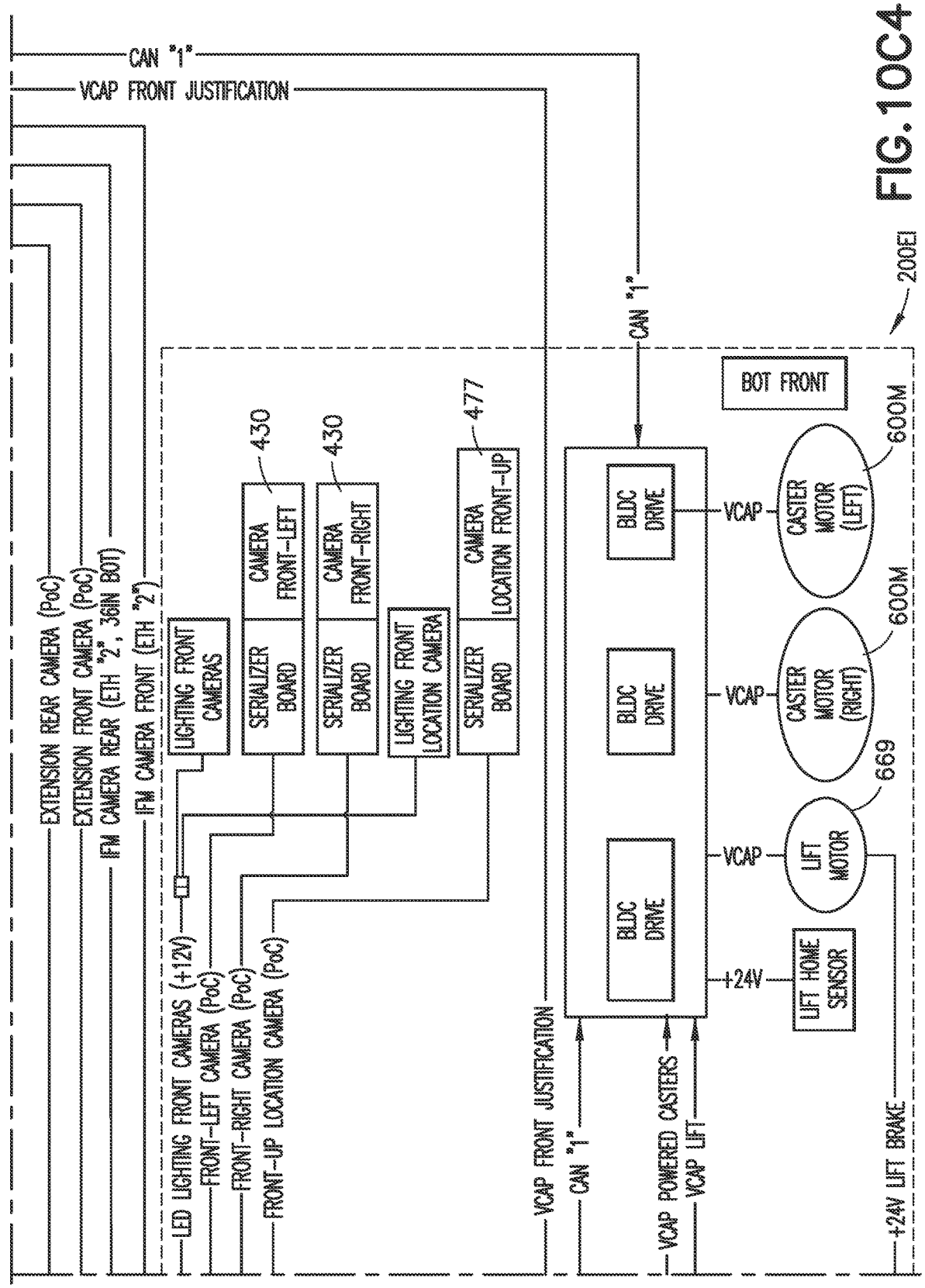

US 12,227,401 B2

AUTONOMOUS TRANSPORT VEHICLE WITH POWER MANAGEMENT

CROSS-REFERENCE TO RELATED APPLICATIONS

This application is a non-provisional of and claims the benefit of U.S. provisional patent application No. 63/251,398, filed on Oct. 1, 2021, the disclosure of which is incorporated herein by reference in its entirety.

BACKGROUND

1. Field

The disclosed embodiment generally relates to material handling systems, and more particularly, to transports for automated storage and retrieval systems.

2. Brief Description of Related Developments

Generally autonomous transport vehicles in logistics/warehouse facilities are manufactured to have a predetermined form factor for an assigned task in a given environment. These autonomous transport vehicles are constructed of a bespoke cast or machined chassis/frame. The other components (e.g., wheels, transfer arms, etc.), some of which may also be bespoke assemblies/components, are mounted to the frame and are carried with the frame as the autonomous transport vehicle traverses along a traverse surface. The transfer arms and payload bay of these autonomous transport vehicles may include numerous components (sensors, encoders, etc.) and motor assemblies for transferring payloads to and from the autonomous transport vehicles as well as for justifying payloads within the payload bay. The motors and sensors may be substantially directly and continuously coupled to a power supply of the autonomous transport vehicle such as through an electrical bus bar.

BRIEF DESCRIPTION OF THE DRAWINGS

The foregoing aspects and other features of the disclosed embodiment are explained in the following description, taken in connection with the accompanying drawings, wherein:

FIGS. 10A, 10B, and 10C are collectively an exemplary schematic of a control system of the autonomous transport vehicle of FIG. 2 in accordance with aspects of the disclosed embodiment;

DETAILED DESCRIPTION

Figure 1A:
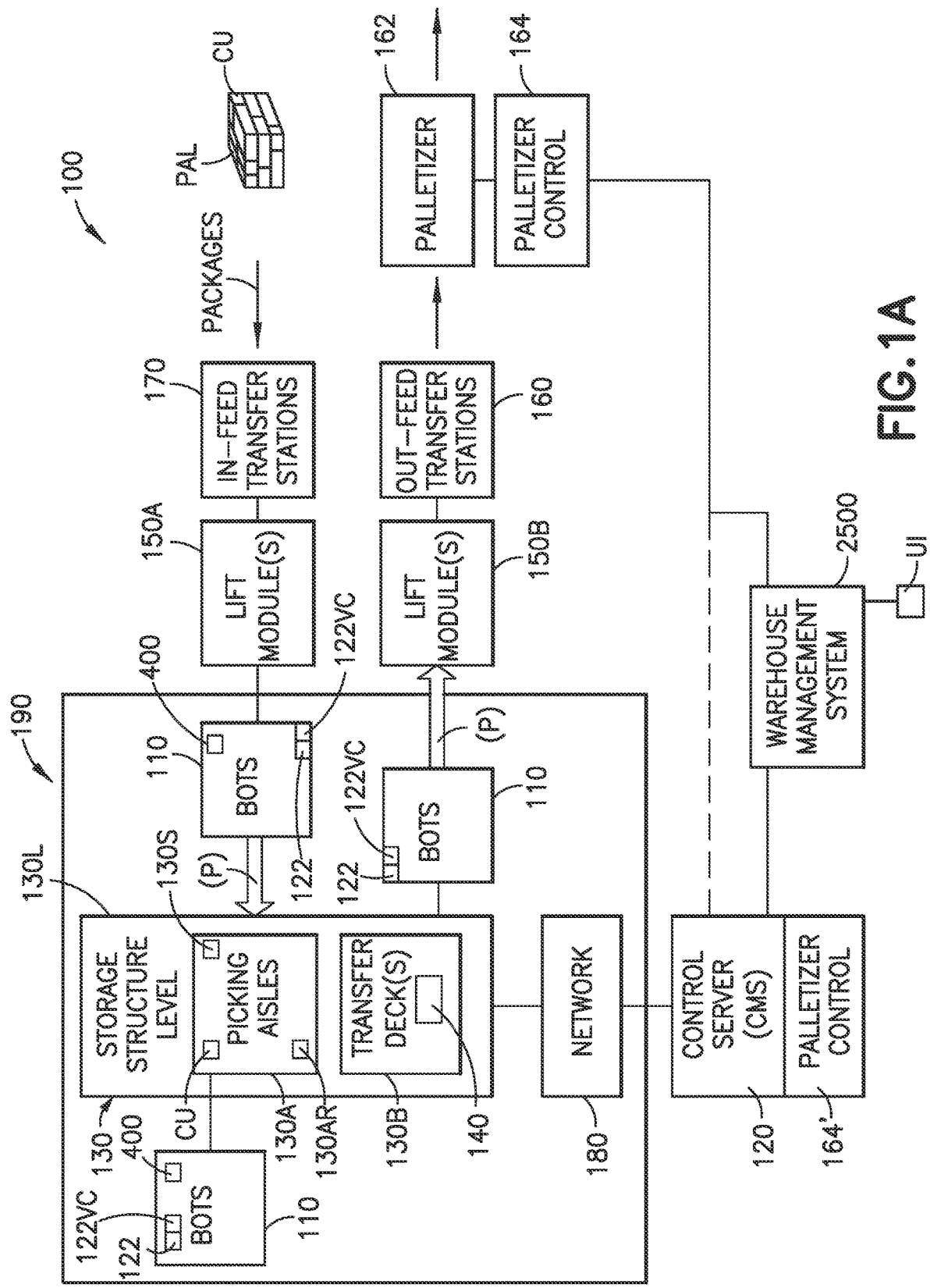
FIG. 1A is a schematic block diagram of an exemplary storage and retrieval system facility incorporating aspects of the disclosed embodiment.
Figure 1B:
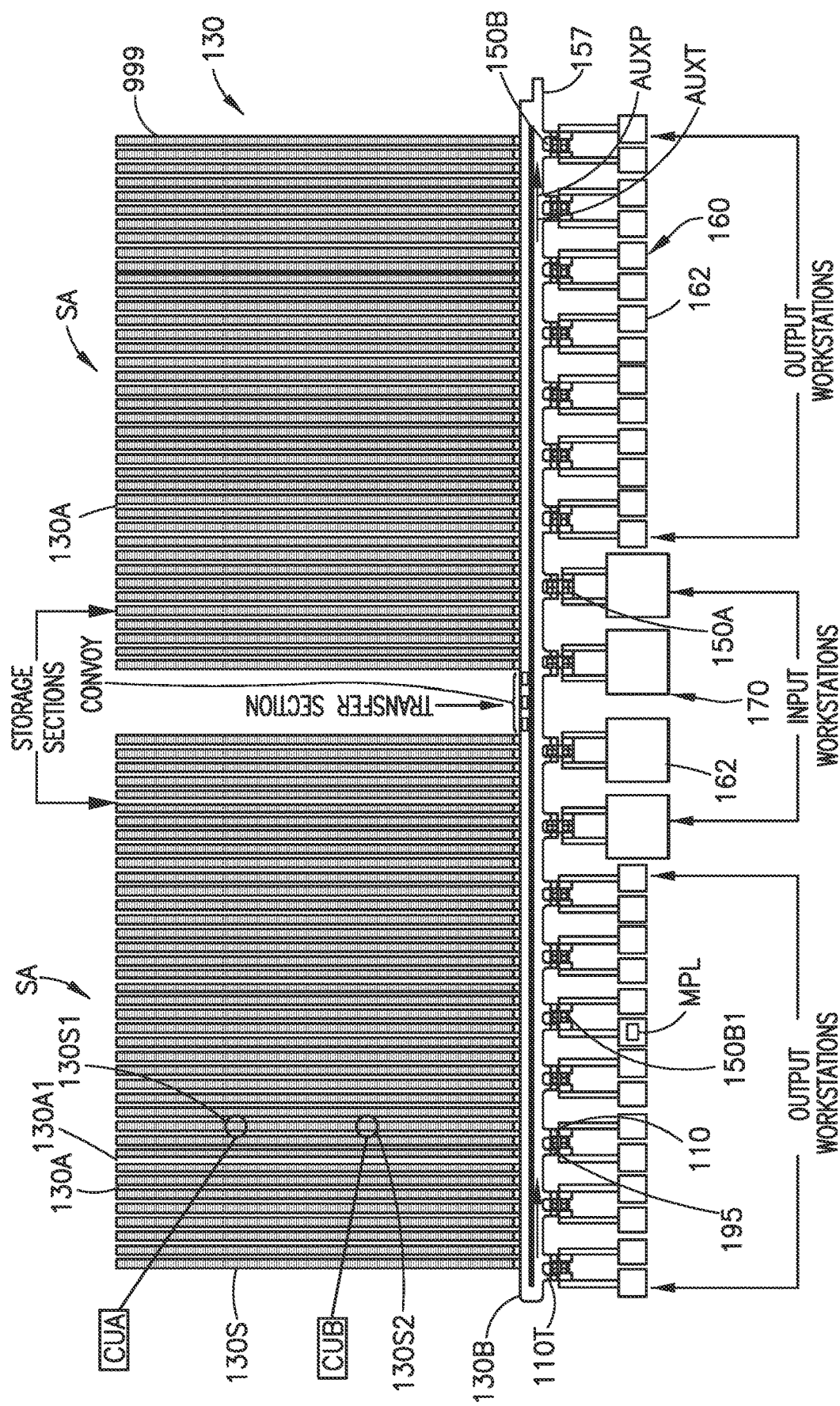
FIG. 1B is a plan view illustration of an the exemplary storage and retrieval system facility of FIG. 1A incorporating aspects of the disclosed embodiment.

FIGS. 1A and 1B illustrate an exemplary automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

Figure 4:
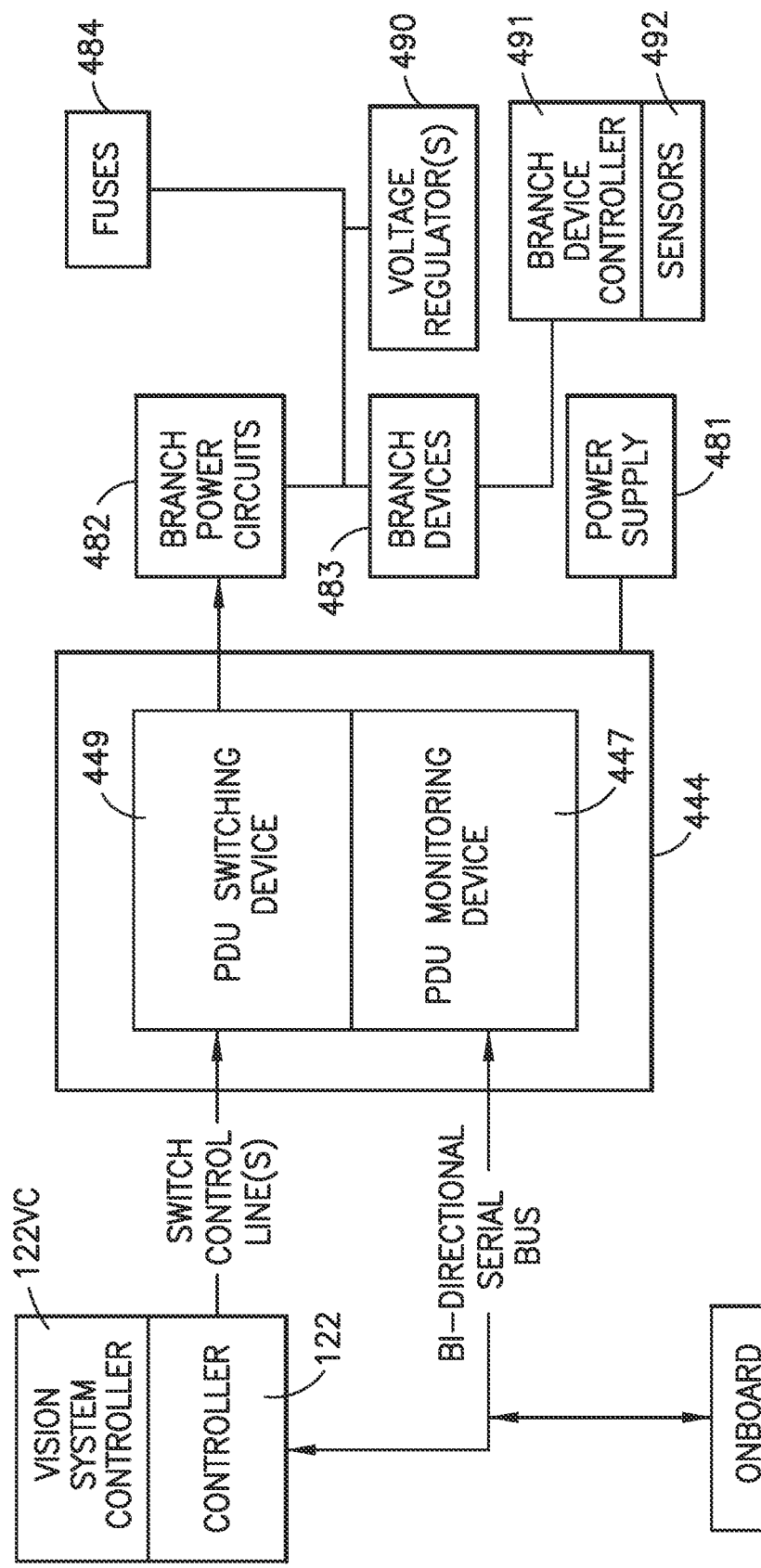
FIG. 4 is an exemplary schematic block diagram of a portion of the autonomous transport vehicle of FIG. 2 in accordance with aspects of the disclosed embodiment.

Referring to FIGS. 1A, 1B and 4, the aspects of the disclosed embodiment provide for an automated storage and retrieval system 100 having autonomous transport vehicles 110. Each autonomous transport vehicle 110 is configured with a comprehensive power management section 444 (also referred to herein as a power distribution unit—see FIG. 4). The power distribution unit 444 is configured to manage power needs of the autonomous transport vehicle 110 so as to preserve higher level functions/operations of the autonomous transport vehicle 110, the higher level functions being preserved depending on a charge level of a power supply of the autonomous transport vehicle 110. For example, control and drive operations may be preserved so that the autonomous transport vehicle 110 traverses to a charging station or maintenance location while other lower level functions of the autonomous transport vehicle (e.g., not needed for the traverse to the charging station or maintenance location) are shut down. Managing low level systems of the autonomous transport vehicle 110 conserves charge of the onboard vehicle power source to improve the operational time of the autonomous transport vehicle 110 between charging operations and preserves autonomous transport vehicle controller functionality.

The power distribution unit 444 may also be configured to control a charge mode of a power supply 481 of the autonomous transport vehicle so as to maximize a number of charge cycles of the power supply 481. The power distribution unit 444 monitors current draw for components (e.g., motors, sensors, controllers, etc. that are communicably coupled to the power source 481 on "branch circuits") of the autonomous transport vehicle 110 and manages (e.g., switches on and off) the power supply to each of the components to conserve the charge (e.g., energy usage) of the power supply 481.

The power distribution unit 444 may be configured to provide electric circuit fault protection (e.g., short circuit protection, over-voltage protection, over-current protection, etc.) for components of the autonomous transport vehicle 110 that are communicably coupled to the power supply 481 as loop devices or loop powered devices. Here, a loop powered device is an electronic device that is connected in a transmitter loop, such as a current loop, without the need to have a separate or independent power source, where the electronic device employs the power from the current flowing in the loop for its operation).

In accordance with the aspects of the disclosed embodiment, the automated storage and retrieval system 100 in FIGS. 1A and 1B may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained). It is noted that the case units CU (also referred to herein as mixed cases, cases, and shipping units) may include cases of items/unit (e.g. case of soup cans, boxes of cereal, etc.) or individual item/units that are adapted to be taken off of or placed on a pallet. In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. Case units may also include totes, boxes, and/or containers of one or more individual goods, unpacked/decommissioned (generally referred to as breakpack goods) from original packaging and placed into the tote, boxes, and/or containers (collectively referred to as totes) with one or more other individual goods of mixed or common types at an order fill station. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases or totes filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's.

The automated storage and retrieval system 100 may be generally described as a storage and retrieval engine 190 coupled to a palletizer 162. In greater detail now, and with reference still to FIGS. 1A and 1B, the storage and retrieval system 100 may be configured for installation in, for example, existing warehouse structures or adapted to new warehouse structures. As noted before the automated storage and retrieval system 100 shown in FIGS. 1A and 1B is representative and may include for example, in-feed and out-feed conveyors terminating on respective transfer stations 170, 160, lift module(s) 150A, 150B, a storage structure 130, and a number of autonomous transport vehicles 110 (also referred to herein as "bots"). It is noted that the storage and retrieval engine 190 is formed at least by the storage structure 130 and the autonomous transport vehicles 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system may also include robot or bot transfer stations (not shown) that may provide an interface between the autonomous transport vehicles 110 and the lift module(s) 150A, 150B. The storage structure 130 may include multiple levels of storage rack modules where each storage structure level 130L of the storage structure 130 includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the autonomous transport vehicles 110 (such as along rails 130AR) while in other aspects the picking aisles are configured to provide unrestrained travel of the autonomous transport vehicle 110 (e.g., the picking aisles are open and undeterministic with respect to autonomous transport vehicle 110 guidance/travel). The transfer decks 130B have open and undeterministic bot support travel surfaces along which the autonomous transport vehicles 110 travel under guidance and control provided by bot steering (as will be described herein). In one or more aspects, the transfer decks have multiple lanes between which the autonomous transport vehicles 110 freely transition for accessing the picking aisles 130A and/or lift modules 150A, 150B. As used herein, "open and undeterministic" denotes the travel surface of the picking aisle and/or the transfer deck has no mechanical restraints (such as guide rails) that delimit the travel of the autonomous transport vehicle 110 to any given path along the travel surface. It is noted that while the aspects of the disclosed embodiment are described with respect to a multilevel storage array, the aspects of the disclosed embodiment may be equally applied to a single level storage array that is disposed on a facility floor or elevated above the facility floor.

The picking aisles 130A, and transfer decks 130B also allow the autonomous transport vehicles 110 to place case units CU into picking stock and to retrieve ordered case units CU. In alternate aspects, each level may also include respective bot transfer stations 140. The autonomous transport vehicles 110 may be configured to place case units, such as the above described retail merchandise, into picking stock in the one or more storage structure levels 130L of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more storage structure levels 130L of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100.

As may be realized, the storage and retrieval system 100 may include multiple in-feed and out-feed lift modules 150A, 150B that are accessible by, for example, autonomous transport vehicles 110 of the storage and retrieval system 100 so that one or more case unit(s), uncontained (e.g. case unit(s) are not held in trays), or contained (within a tray or tote) can be transferred from a lift module 150A, 150B to each storage space on a respective level and from each storage space to any one of the lift modules 150A, 150B on a respective level. The autonomous transport vehicles 110 may be configured to transfer the case units between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level of the storage space where the case unit(s) is stored and retrieved. The lift module(s) may have any suitable configuration, such as for example reciprocating lift, or any other suitable configuration. The lift module(s) 150A, 150B include any suitable controller (such as control server 120 or other suitable controller coupled to control server 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system may include a control system, comprising for example one or more control servers 120 that are communicably connected to the in-feed and out-feed conveyors and transfer stations 170, 160, the lift modules 150A, 150B, and the autonomous transport vehicles 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) managing the case flow system. The network 180 may further include suitable communication for effecting a bi-directional interface with the autonomous transport vehicles 110. For example, the autonomous transport vehicles 110 may include an on-board processor/controller 122 (which is configured to effect at least control and safety functions of the autonomous transport vehicle 110—see also FIGS. 10A-10C). The network 180 may include a suitable bi-directional communication suite enabling the autonomous transport vehicle controller 122 to request or receive commands from the control server 120 for effecting desired transport (e.g. placing into storage locations or retrieving from storage locations) of case units and to send desired autonomous transport vehicle 110 information and data including autonomous transport vehicle 110 ephemeris, status and other desired data, to the control server 120. As seen in FIGS. 1A and 1B, the control server 120 may be further connected to a warehouse management system 2500 for providing, for example, inventory management, and customer order fulfillment information to the CMS level program of control server 120. A suitable example of an automated storage and retrieval system arranged for holding and storing case units is described in U.S. Pat. No. 9,096,375, issued on Aug. 4, 2015 the disclosure of which is incorporated by reference herein in its entirety.

Figure 2:
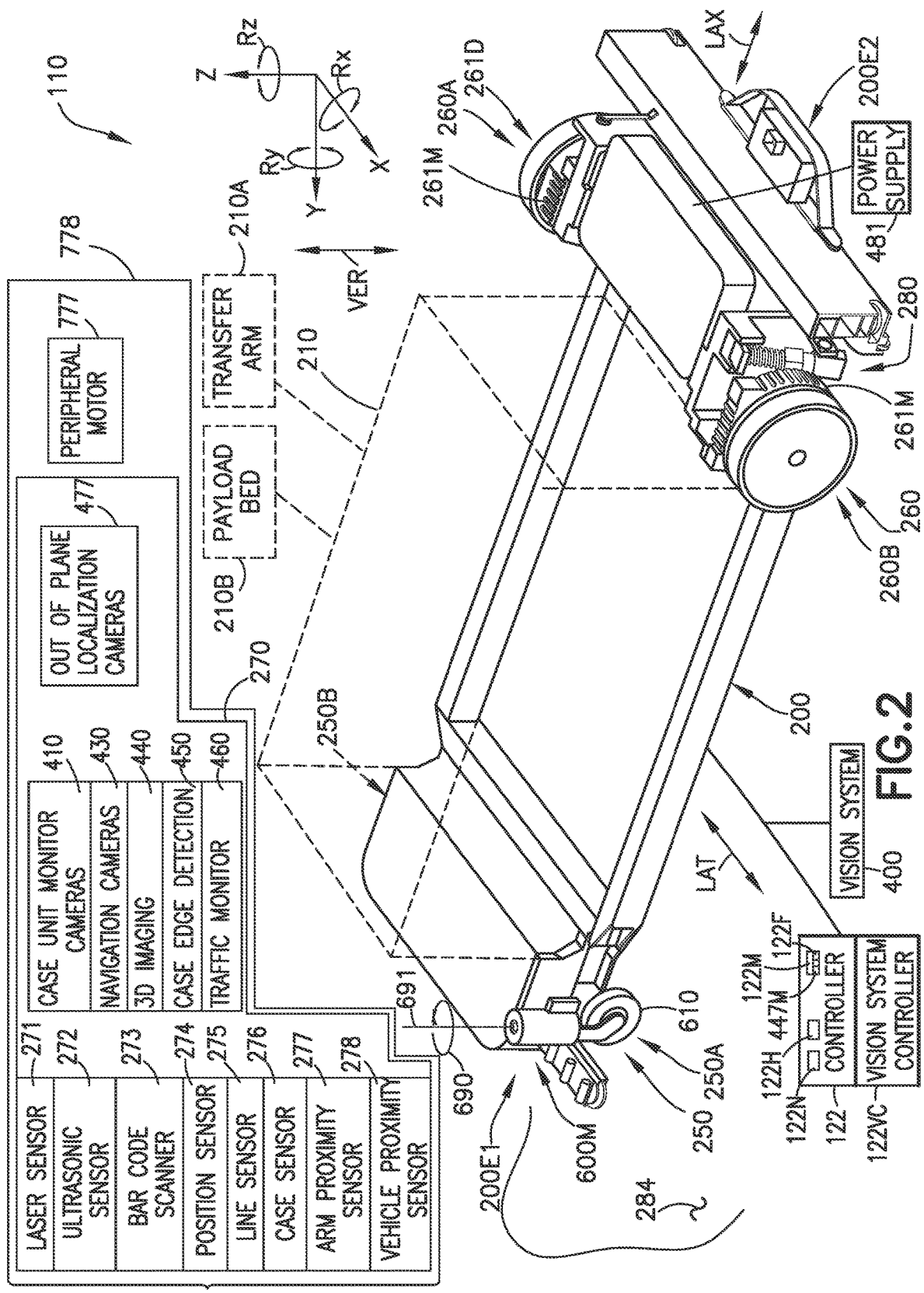
FIG. 2 is an exemplary perspective illustration of an autonomous transport vehicle of the exemplary storage and retrieval system facility of FIG. 1A in accordance with aspects of the disclosed embodiment.

Referring now to FIGS. 1A, 1B, and 2, the autonomous transport vehicle 110 (which may also be referred to herein as an autonomous guided vehicle or bot) includes a vehicle frame or chassis 200 (referred to herein as a frame) with a power supply 481 mounted thereon and a payload support or bed 210B. The frame 200 has a front end 200E1 and a back end 200E2 that define a longitudinal axis LAX of the autonomous transport vehicle 110. The frame 200 may be constructed of any suitable material (e.g., steel, aluminum, composites, etc.). As described herein, powered sections are connected to the frame 200, where each powered section is powered by the power supply 481. The powered sections include a drive section, 261D, a payload handling section 210 (also referred to herein as a case handling assembly), and a peripheral electronics section 778.

The payload handling section or case handling assembly 210 has at least one payload handling actuator (e.g., transfer arm 210A) configured so that actuation of the payload handling actuator effects transfer of the payload (e.g., case unit) to and from the payload bed 210B, of the frame, and a storage (e.g., storage spaces 130S of storage shelves) in the facility. In some aspects, the case handling assembly 210 includes the payload bed 210B (also referred to herein as a payload bay or payload hold) and is configured so as to move the payload bed in direction VER; in other aspects where the payload bed 210B is formed by the frame 200 the payload bed may be fixed/stationary in direction VER. As may be realized, payloads are placed on the payload bed 210B for transport.

The transfer arm 210A is configured to (autonomously) transfer a payload (such as a case unit CU), with a flat undeterministic seating surface seated in the payload bed 210B, to and from the payload bed 210B of the autonomous guided vehicle 110 and a storage location (such as storage space 130S on storage shelf 555 (see FIG. 5A), a shelf of lift module 150A, 150B, buffer, transfer station, and/or any other suitable storage location), of the payload CU, in a storage array SA, where the storage location 130S, in the storage array SA, is separate and distinct from the transfer arm 210A and the payload bed 21B. The transfer arm 210A is configured with extension motors 667A-667C and lift motor(s) 669 that configure the transfer arm 210A to extend laterally in direction LAT and/or vertically in direction VER to transport payloads to and from the payload bed 210B. The payload bed 210B includes a front and rear justification module 210ARJ, 210AFJ configured to justify case units along the longitudinal axis LAX and laterally in direction LAT anywhere within the payload bed 210B. For example, the payload bed includes justification arms JAR (FIGS. 10A and 10C) that are driven along the longitudinal axis by respective justification motors 668B, 668E so as to justify the case unit(s) CU along the longitudinal axis LAX. Pushers JPS and pullers JPP (FIGS. 10A and 10C) may be movably mounted to the justification arms so as to be driven by respective motors 668A, 668C, 668D, 668F in direction LAT so as to justify the case unit(s) CU in direction LAT. One or more of the motors 668A-668F may also be operated to clamp or grip the case unit(s) CU held in the payload bed 210B such as during case unit transport by the vehicle 110.

Examples of suitable payload beds 210B and transfer arms 210A and/or autonomous transport vehicles to which the aspects of the disclosed embodiment may be applied can be found in U.S. provisional patent application No. 63/236,591, filed on Aug. 24, 2021 and titled "Autonomous Transport Vehicle" as well as United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

The frame 200 includes one or more idler wheels or casters 250 disposed adjacent the front end 200E1. The frame 200 also includes one or more drive wheels 260 disposed adjacent the back end 200E2. In other aspects, the position of the casters 250 and drive wheels 260 may be reversed (e.g., the drive wheels 260 are disposed at the front end 200E1 and the casters 250 are disposed at the back end 200E2). It is noted that in some aspects, the autonomous transport vehicle 110 is configured to travel with the front end 200E1 leading the direction of travel or with the back end 200E2 leading the direction of travel. In one aspect, casters 250A, 250B (which are substantially similar to caster 250 described herein) are located at respective front corners of the frame 200 at the front end 200E1 and drive wheels 260A, 260B (which are substantially similar to drive wheel 260 described herein) are located at respective back corners of the frame 200 at the back end 200E2 (e.g., a support wheel is located at each of the four corners of the frame 200) so that the autonomous transport vehicle 110 stably traverses the transfer deck(s) 130B and picking aisles 130A of the storage structure 130.

The autonomous transport vehicle 110 includes a drive section 261D, connected to the frame 200, having motors 261M that power (or drive) drive wheels 260 (supporting the vehicle 110 on a traverse/rolling surface 284), where the drive wheels 260 effect vehicle traverse on the traverse surface 284 moving the autonomous guided vehicle 110 over the traverse surface 284 in a facility (e.g., such as a warehouse, store, etc.) under autonomous guidance. The drive section 261D has at least a pair of traction drive wheels 260 (also referred to as drive wheels 260—see drive wheels 260A, 260B) astride the drive section 261D. The drive wheels 260 have a fully independent suspension 280 coupling each drive wheel 260A, 260B of the at least pair of drive wheels 260 to the frame 200, with at least one intervening pivot link (described herein) between at least one drive wheel 260A, 260B and the frame 200 configured to maintain a substantially steady state traction contact patch between the at least one drive wheel 260A, 260B and rolling/travel surface 395 (also referred to as autonomous vehicle travel surface 395) over rolling surface transients (e.g., bumps, surface transitions, etc.) Suitable examples of the fully independent suspension 280 can be found in U.S. provisional patent application No. 63/213,589 titled "Autonomous Transport Vehicle with Synergistic Vehicle Dynamic Response" filed on Jun. 22, 2021, the disclosure of which is incorporated herein by reference in its entirety.

Figure 3A:
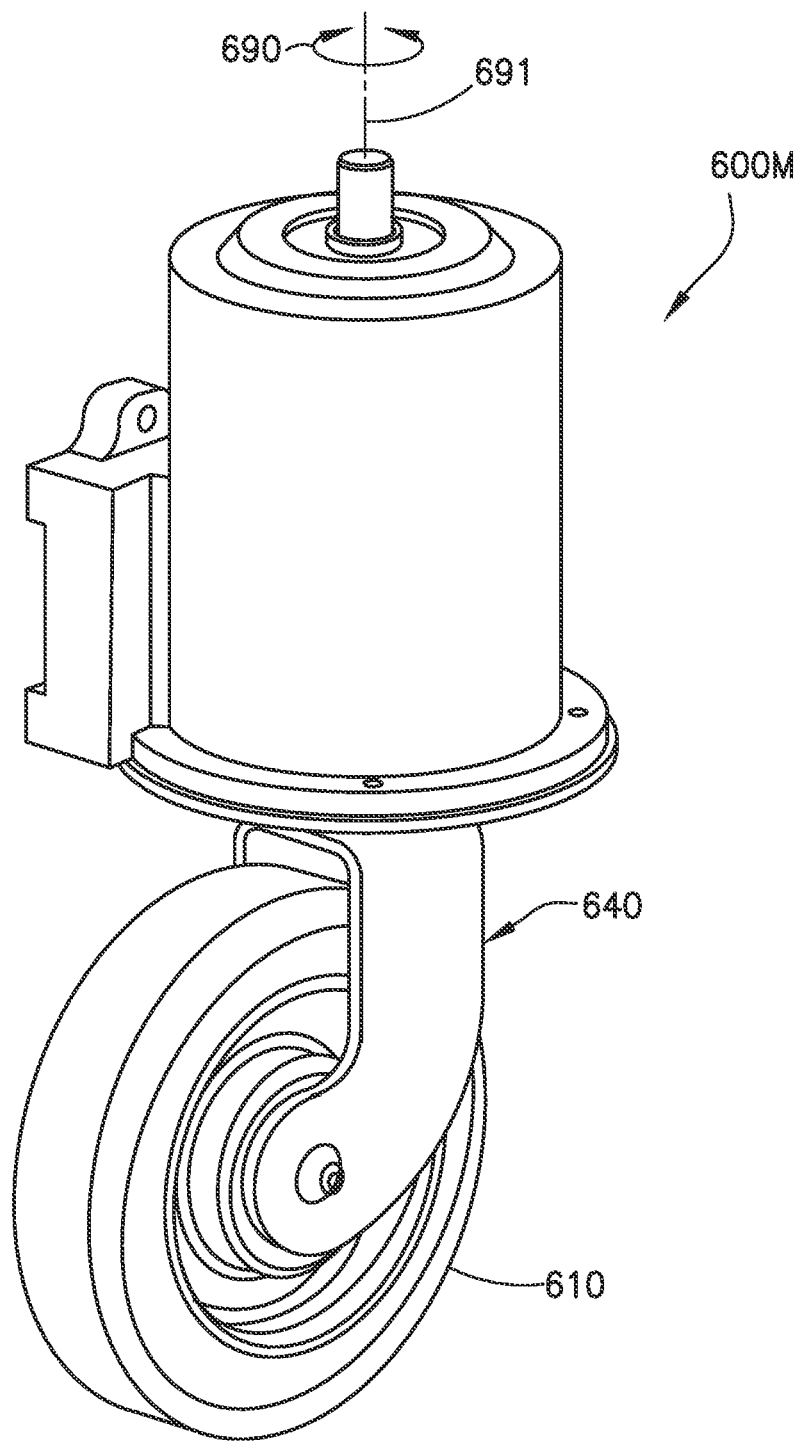
FIGS. 3A and 3B are exemplary perspective illustrations of portions of the autonomous transport vehicle of FIG. 2 in accordance with aspects of the disclosed embodiment.
Figure 3B:
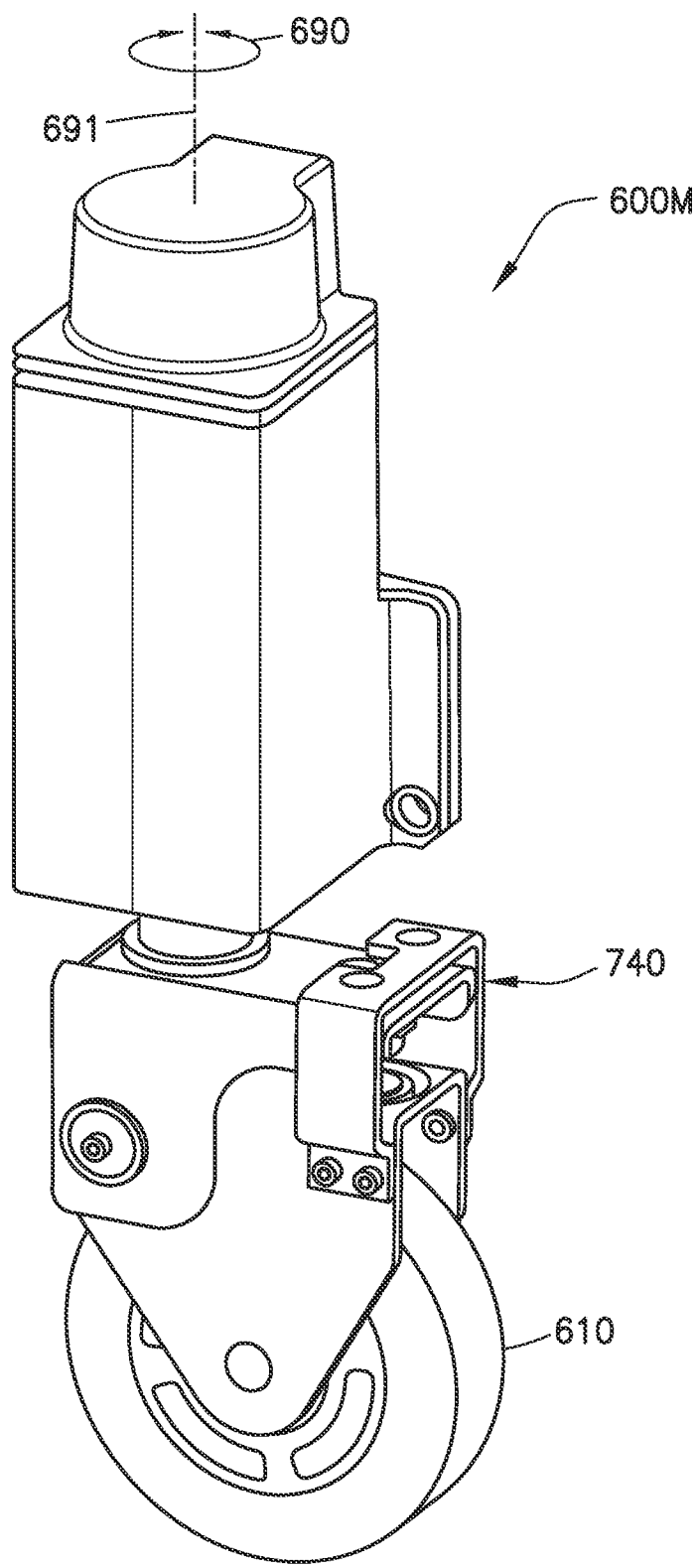

As described above, and also referring to FIGS. 3A and 3B, the frame 200 includes one or more casters 250 disposed adjacent the front end 200E1. In one aspect, a caster 250 is located adjacent each front corner of the frame 200 so that in combination with the drive wheels 260 disposed at each rear corner of the frame 200, the frame 200 stably traverses the transfer deck 130B and picking aisles 130A of the storage structure 130. Referring to FIGS. 2, 3A and 3B, in one aspect, each caster 250 comprises a motorized (e.g., active/motorized steering) caster 600M; however, in other aspects the caster 250 may be a passive (e.g., un-motorized) caster. In one aspect, the motorized caster 600M includes a caster wheel 610 coupled to a fixed geometry wheel fork 640 (FIG. 3A); while in other aspects the caster wheel 610 is coupled to a variable geometry or articulated (e.g., suspension) fork 740. Each motorized caster 600M is configured to actively pivot its respective caster wheel 610 (independent of the pivoting of other wheels of other motorized casters) in direction 690 about caster pivot axis 691 to at least assist in effecting a change in the travel direction of the autonomous transport vehicle 110. Suitable examples of casters can be found in U.S. provisional patent application No. 63/213,589 filed on Jun. 22, 2021 (previously incorporated herein by reference in its entirety) and U.S. provisional patent application No. 63/193,188 titled "Autonomous Transport Vehicle with Steering" filed on May 26, 2021, the disclosure of which is incorporated herein by reference in its entirety.

The peripheral electronics section 778 includes a sensor system 270 and at least one peripheral motor 777 connected to the frame 200. The sensor system 270 includes, at least one of an autonomous pose and navigation sensor and at least one payload handling sensor. The at least one peripheral motor 777 is any suitable motor, such as a suspension lock motor and/or caster steering motors 600M, suitable examples of which are described in U.S. provisional patent application No. 63/213,589 titled "Autonomous Transport Vehicle with Synergistic Vehicle Dynamic Response" and filed on Jun. 22, 2021; and U.S. provisional patent application No. 63/193,188 titled "Autonomous Transport Vehicle with Steering" and filed on May 26, 2021, the disclosures of which are incorporated herein by reference in their entireties. Here, the peripheral motor 777 is separate and distinct from each of the motors (e.g., motors 261M) of the drive section 261D and each actuator of the case handling assembly 210.

The autonomous pose and navigation sensor includes, for exemplary purposes only, one or more of laser sensor(s) 271, ultrasonic sensor(s) 272, bar code scanner(s) 273, position sensor(s) 274, line sensor(s) 275, vehicle proximity sensor(s) 278, or any other suitable sensors for sensing a position of the vehicle 110. The at least one payload handling sensor, for exemplary purposes, includes case sensors 278 (e.g., for sensing case units within the payload bed 210B onboard the vehicle 110 or on a storage shelf off-board the vehicle 110), arm proximity sensor(s) 277, or any other suitable sensors for sensing a payload (e.g., case unit CU) and it location/pose during autonomous transport vehicle handling of the payload. Suitable examples of sensors that may be included in the sensor system 270 are described in U.S. provisional patent application No. 63/236,591 titled "Autonomous Transport Vehicle" and filed on Aug. 24, 2021, as well as U.S. Pat. No. 8,425,173 titled "Autonomous Transport for Storage and Retrieval Systems" issued on Apr. 23, 2013, U.S. Pat. No. 9,008,884 titled Bot Position Sensing" issued on Apr. 14, 2015, and U.S. Pat. No. 9,946,265 titled Bot Having High Speed Stability" issued on Apr. 17, 2018, the disclosures of which are incorporated herein by reference in their entireties.

Referring also to FIGS. 10A, 10B, and 10C, the sensors of the sensor system 270 may be configured to provide the vehicle 110 with, for example, awareness of its environment (in up to six degrees of freedom X, Y, Z, Rz, Ry, Rz—see FIG. 2) and external objects, as well as the monitor and control of internal subsystems. For example, the sensors may provide guidance information, payload information, or any other suitable information for use in operation of the vehicle 110 such as described herein and/or as described in, for example, U.S. provisional patent application titled "Autonomous Transport Vehicle" and having U.S. provisional application No. 63/236,591 filed on Aug. 24, 2021, and U.S. provision patent application titled "Autonomous Transport Vehicle with Vision System" and having U.S. provisional patent application No. 63/232,546 filed on Aug. 12, 2021, the disclosures of which are incorporated herein by reference in their entireties.

The bar code scanner(s) 273 may be mounted on the autonomous transport vehicle 110 in any suitable location. The bar code scanners(s) 273 may be configured to provide an absolute location of the vehicle 110 within the storage structure 130. The bar code scanner(s) 273 may be configured to verify aisle references and locations on the transfer decks by, for example, reading bar codes located on, for example the transfer decks, picking aisles and transfer station floors to verify a location of the vehicle 110. The bar code scanner(s) 273 may also be configured to read bar codes located on items stored in the shelves 555.

The position sensors 274 may be mounted to the vehicle 110 at any suitable location. The position sensors 274 may be configured to detect reference datum features (or count the slats 520L of the storage shelves 555) (e.g. see FIG. 5A) for determining a location of the vehicle 110 with respect to the shelving of, for example, the picking aisles 130A (or a buffer/transfer station located adjacent the transfer deck 130B or lift 150). The reference datum information may be used by the controller 122 to, for example, correct the vehicle's odometry and allow the vehicle 110 to stop with the support tines 210AT of the transfer arm 210A positioned for insertion into the spaces between the slats 520L. In one exemplary embodiment, the vehicle 110 may include position sensors 274 on the drive (rear) end 270E2 and the driven (front) end 270E1 of the vehicle 110 to allow for reference datum detection regardless of which end of the vehicle 110 is facing the direction the vehicle is travelling.

The line sensors 275 may be any suitable sensors mounted to the vehicle 110 in any suitable location, such as for exemplary purposes only, on the frame 200 disposed adjacent the drive (rear) and driven (front) ends 200E2, 200E1 of the vehicle 110. For exemplary purposes only, the line sensors 275 may be diffuse infrared sensors. The line sensors 275 may be configured to detect guidance lines provided on, for example, the floor of the transfer decks 130B. The vehicle 110 may be configured to follow the guidance lines when travelling on the transfer decks 130B and defining ends of turns when the vehicle is transitioning on or off the transfer decks 130B. The line sensors 275 may also allow the vehicle 110 to detect index references for determining absolute localization where the index references are generated by crossed guidance lines (see FIG. 9A).

The case sensors 276 may include case overhang sensors and/or other suitable sensors configured to detect the location/pose of a case unit CU within the payload bed 210B. The case sensors 276 may be any suitable sensors that are positioned on the vehicle so that the sensor(s) field of view(S) span the payload bed 210B adjacent the top surface of the support tines 210AT (see FIGS. 4A and 4B). The case sensors 276 may be disposed at the edge of the payload bed 210B (e.g., adjacent a transport opening 1199 of the payload bed 210B to detect any case units CU that are at least partially extending outside of the payload bed 210B.

The arm proximity sensors 277 may be mounted to the vehicle 110 in any suitable location, such as for example, on the transfer arm 210A. The arm proximity sensors 277 may be configured to sense objects around the transfer arm 210A and/or support tines 210AT of the transfer arm 210A as the transfer arm 210A is raised/lowered and/or as the support tines 210AT are extended/retracted.

The laser sensors 271 and ultrasonic sensors 272 may be configured to allow the vehicle 110 to locate itself relative to each case unit forming the load carried by the vehicle 110 before the case units are picked from, for example, the storage shelves 555 and/or lift 150 (or any other location suitable for retrieving payload). The laser sensors 271 and ultrasonic sensors 272 may also allow the vehicle to locate itself relative to empty storage locations 130S for placing case units in those empty storage locations 130S. The laser sensors 271 and ultrasonic sensors 272 may also allow the vehicle 110 to confirm that a storage space (or other load depositing location) is empty before the payload carried by the vehicle 110 is deposited in, for example, the storage space 130S. In one example, the laser sensor 271 may be mounted to the vehicle 110 at a suitable location for detecting edges of items to be transferred to (or from) the vehicle 110. The laser sensor 271 may work in conjunction with, for example, retro-reflective tape (or other suitable reflective surface, coating or material) located at, for example, the back of the shelves 555 to enable the sensor to "see" all the way to the back of the storage shelves (such as along the picking aisles 130A). The reflective tape located at the back of the storage shelves allows the laser sensor 1715 to be substantially unaffected by the color, reflectiveness, roundness, or other suitable characteristics of the items located on the shelves. The ultrasonic sensor 272 may be configured to measure a distance from the vehicle 110 to the first item in a predetermined storage area of the shelves to allow the vehicle 110 to determine the picking depth (e.g. the distance the support tines 210AT travel into the shelves for picking the item(s) off of the shelves). One or more of the laser sensors 271 and ultrasonic sensors 272 may allow for detection of case orientation (e.g. skewing of cases within the storage shelves) by, for example, measuring the distance between the vehicle 110 and a front surface of the case units to be picked as the vehicle 110 comes to a stop adjacent the case units to be picked. The case sensors may allow verification of placement of a case unit on, for example, a storage shelf by, for example, scanning the case unit after it is placed on the shelf.

Vehicle proximity sensors 278 may also be disposed on the frame 200 for determining the location of the vehicle in the picking aisle 130A and/or relative to lifts 150. The vehicle proximity sensors 278 are located on the vehicle 110 so as to sense targets or position determining features disposed on rails 130AR on which the vehicle 110 travels through the picking aisles 130A (and/or on walls of transfer areas 195 and/or lift 150 access location). The position of the targets on the rails 130AR are in known locations so as to form incremental or absolute encoders along the rails 130AR. The vehicle proximity sensors 278 sense the targets and provide sensor data to the controller 122 so that the controller 122 determines the position of the vehicle 110 along the picking aisle 130A based on the sensed targets.

Referring to FIGS. 1A, 1B, and 2, the sensor system 270 of the autonomous transport vehicle 110 also includes, at least in part, a vision system 400 with cameras disposed to capture image data informing the at least one of a vehicle navigation pose or location (relative to the storage and retrieval system structure or facility in which the vehicle 110 operates) and payload pose or location (relative to the storage locations or payload bed 210B).

Referring to FIGS. 2, 10, 10B, and 10C, the vision system 400 includes one or more of the following: case unit monitoring cameras 410, navigation cameras 430, one or more three-dimensional imaging system 440, one or more case edge detection sensors 450, one or more traffic monitoring camera 460, and one or more out of plane (e.g., upward or downward facing) localization cameras 477. Suitable examples of a vision system and associated sensors can be found in U.S. provisional patent application titled "Autonomous Transport Vehicle with Vision System" and having U.S. provisional patent application No. 63/232,546 filed on Aug. 12, 2021, the disclosure of which was previously incorporated herein by reference in its entirety.

The out of plane localization cameras 477 may be employed with the line following sensors 275 and provide a broader field of view than the line following sensors 275 to place the autonomous transport vehicle 110 back on a followed line if the autonomous transport vehicle 110 strays from the followed line to a point outside the detection area of the line following sensor 275.

The case edge detection sensors 450A, 450B, and the case unit monitoring cameras 410 are employed to effect case handling by the vehicle 110. Case handling includes picking and placing case units from case unit holding locations (such as case unit localization, verification of the case unit, and verification of placement of the case unit in the payload bed 210B and/or at a case unit holding location such as a storage shelf or buffer location).

The traffic monitoring cameras 460 may be employed to effect travel transitions of the autonomous transport vehicle 110 from a picking aisle 130A to the transfer deck 130B (e.g., entry to the transfer deck 130B and merging of the autonomous transport vehicle 110 with other autonomous transport vehicles travelling along the transfer deck 130B).

The one or more three-dimensional imaging system 440 may be employed for case handling operations and case unit pose and location (e.g., on a storage shelf or other holding location and within the payload bed 210B) determinations. The one or more three-dimensional imaging system 440 may be employed along with the case edge detection sensors 450A, 450B, and the case unit monitoring cameras 410 to effect localization of the autonomous transport vehicle relative to case units CU held in a storage space 130S or other suitable holding location of the storage and retrieval system 100.

The navigation cameras 430 (e.g., forward facing or rearward facing) are any suitable cameras configured to provide object detection and ranging. The forward and/or rearward navigation cameras 430 provide for autonomous transport vehicle 110 navigation with obstacle detection and avoidance (with either end 200E1 of the autonomous transport vehicle 110 leading a direction of travel or trailing the direction of travel) as well as localization of the autonomous transport vehicle within the storage and retrieval system 100. Localization of the autonomous transport vehicle 110 may be effected by one or more of the navigation cameras 430 by detection of lines on the travel/rolling surface 284 and/or by detection of suitable storage structure, including but not limited to storage rack (or other) structure of the storage and retrieval system.

The one or more case edge detection sensors 450 are any suitable sensors such as laser measurement sensors configured to scan the shelves of the storage and retrieval system to verify the shelves are clear for placing case units CU, or to verify a case unit size and position before picking the case unit CU.

The one or more traffic monitoring cameras 460 are disposed on the frame 200 so that a respective field of view 460AF, 460BF faces laterally in lateral direction LAT. The traffic monitoring cameras 460A, 460B provide for an autonomous merging of autonomous transport vehicles 110 exiting, for example, a picking aisle 130A or lift transfer area 195 onto the transfer deck 130B (see FIG. 1B). For example, the autonomous transport vehicle 110 leaving the lift transfer area 195 (FIG. 1B) detects autonomous transport vehicle 110T travelling along the transfer deck 130B.

The vision system 400 includes a vision system controller 122VC (which may be part of controller 122) configured to process data from the vision system sensors (described above) to effect autonomous transport vehicle 110 operations in a manner substantially similar to that described in U.S. provisional patent application titled "Autonomous Transport Vehicle with Vision System" and having U.S. provisional patent application No. 63/232,546 filed on Aug. 12, 2021, the disclosure of which was previously incorporated herein by reference in its entirety.

Referring to FIGS. 2, 4, 5, 10A-10C, and 11, the autonomous transport vehicle 110 includes the controller 122 that is coupled respectively to the drive section 261D, the case handling assembly 210, the peripheral electronics section 778, and other components/features of the autonomous transport vehicle 110 that are described herein so as to form a control system 122CS (see FIGS. 10A-10C). The control system 122CS effects each autonomous operation of the autonomous transport vehicle 110 described herein. The controller system 122CS may be configured to provide communications, supervisory control, vehicle localization, vehicle navigation and motion control, payload sensing, payload transfer, and vehicle power management as described herein. In this and other aspects, the control system may also be configured to provide any suitable services to the vehicle 110. The control system 122CS includes any suitable non-transitory program code and/or firmware that configure the vehicle 110 to perform the vehicle operations described herein. The control system 122CS may be configured for (but is not limited to) one or more of remote updating of control system firmware/software, remote debugging of the vehicle 110, remote operation of the vehicle 110, tracking a position of the vehicle 110, tracking operational status of the vehicle 110, and tracking any other suitable information pertaining to the vehicle 110.

As illustrated in, for example, FIGS. 10A-10C, the control system 122CS is a distributed control system that includes, as described, herein, the controller 122, the vision system controller 122VC, and the power management section 444 (which includes the switching device 449 and the monitoring and control device 447). In some aspects, one or more of the vision system controller 122VC and the power management section 444 are at least partially integral to the controller 122; while in other aspects one or more of the system controller 122VC and the power management section 444 are separate from but communicably coupled to the controller 122. Components of the control system (e.g., sensors, cameras, lighting, drives, motors, etc.) may be distributed throughout the autonomous transport vehicle 110 and communicably coupled to the controller 122 in any suitable manner (such as described in FIGS. 10A-10C).

The controller 122 includes at least one of an autonomous navigation control section 122N and an autonomous payload handling control section 122H. The autonomous navigation control section 122N is configured to register and hold in a volatile memory (such as memory 446 of a comprehensive power management section 444 of the controller 122) autonomous guided vehicle state and pose navigation information that is deterministic (and provided in real time) of and describes current and predicted state, pose, and location of the autonomous transport vehicle 110. The autonomous transport vehicle state and pose navigation information includes both historic and current autonomous guided vehicle state and pose navigation information. The state, pose, and location information is deterministic (and provided in real time) and describes the current and predicted state, pose, and location in up to six degrees of freedom X, Y, Z, Rx, Ry, Rz so that the historic, current and predicted state, pose, and location is described in full. The autonomous payload handling control section 122H is configured to register and hold in the volatile memory (such as memory 446) current payload identity, state, and pose information (e.g., both historic and current). The payload identity, state, and pose information describes historic and current payload identity, payload pose and state location relative to a frame of reference of the autonomous transport vehicle (e.g., such as the X, Y, Z coordinate axes and suitable datum surfaces within the payload bed 210B), and pick/place locations of current and historic payloads.

As described herein the controller 122 comprises a comprehensive power management section 444 (also referred to as a power distribution unit—see also FIG. 11) that is separate and distinct from each other section (such as the vision system controller 122VC) of the controller 122. As will be described herein, the power distribution unit 444 is communicably connected to the power supply 481 so as to monitor a charge level (e.g., voltage level or current level) of the power supply 481. As also described herein, the power distribution unit 444 is connected to each respective branch circuit 482 (also referred to herein as a branch power circuit—see FIG. 11 as a non-limiting example) of the drive section 261D, the case handling assembly 210 and the peripheral electronics section 778 respectively powering the drive section 261D, the case handling assembly 210, and the peripheral electronics section 778 from the power supply 481. The power distribution unit 444 is configured to comprehensively manage power consumption to each respective branch circuit 482 based on demand level of each branch circuit 482 relative to the charge level available from the power supply 481.

The power distribution unit 444 includes a monitoring and control device 447 (referred to herein as monitoring device 447), a switching device 449 (having switches 449S), a memory 446, a wireless communications module 445, and an analog to digital converter 448 (referred to herein as AD converter 448). The monitoring device 447 is any suitable processing device configured to monitor at least the current usage and fuse status of the branch power circuits 482 and control shutdown of one or more selected branch power circuits 482 as described herein. For example, the monitoring device 447 is one or more of a field-programmable gate array (FPGA), a complex programmable logic device (CPLD), a system on chip integrated circuit (SOC), and a central processing unit (CPU). The monitoring device 447 operates independent of the controller 122 and vision system controller 122VC, and the monitoring device 447 is programmed with non-transitory code to manage (e.g., at least power distribution to) one or more low level systems of the autonomous transport vehicle 110.

Referring to FIGS. 1A, 1B, 2, 4, 5, 10A-10C, and 11, the power distribution unit 444 is configured to communicate with and control at least one branch device 483. For example, the power distribution unit 444 is communicably coupled to one or more of the analog sensors 483C (e.g., case edge detection sensors, line following sensors 275, and other analog sensors as described herein), the digital sensors 483B (e.g., cameras 410, 440, 450 of the vision system 400 and other digital sensors described herein), lights 483A, casters 250, drive/traction wheels 260, transfer arm 210A extension motor 667A-667C, transfer arm lift motors 669, payload justification motors 668A-668F of the payload bed 210B/transfer arm 210A, suspension lock motors, and any other suitable features of the autonomous transport vehicle 110 (see FIGS. 5, 6, and 11) so as to provide power to (e.g., turn on and maintain powered operation of) the analog sensors 483C, the digital sensors 483B, and lights 483A, casters 250, drive/traction wheels 260, transfer arm 210A extension motors 667, transfer arm lift motors 669, payload justification motors 668 of the payload bed 210B/transfer arm 210A, suspension lock motors, and any other suitable features. Here, the power distribution unit 444 may receive commands from the controller 122 to actuate one or more of the analog sensors 483C and the digital sensors 483B so that the one or more of the analog sensors 483C and the digital sensors 483B obtain one or more of pose and location information of the autonomous transport vehicle within the storage and retrieval system 100 storage structure 130 in a manner substantially similar to that described in U.S. provisional patent application titled "Autonomous Transport Vehicle with Vision System" and having U.S. provisional patent application No. 63/232,546 filed on Aug. 12, 2021, and U.S. Pat. No. 8,425,173 titled "Autonomous Transport for Storage and Retrieval Systems" issued on Apr. 23, 2013; U.S. Pat. No. 9,008,884 titled "Bot Position Sensing" issued on Apr. 14, 2015; and U.S. Pat. No. 9,946,265 titled Bot Having High Speed Stability" issued on Apr. 17, 2018, the disclosures of which are incorporated herein by reference in their entireties. The power distribution unit 444 is configured to process and filter (in any suitable manner) the sensor data obtained by the one or more of the analog sensors 483C and the digital sensors 483B. The power distribution unit 444 may also be configured to process and filter (in any suitable manner) control signals sent by the controller 122 (or vision system controller 122VC) to the one or more of the analog sensors 483C and the digital sensors 483B. Where the sensor is an analog sensor 483C the power distribution unit 444 includes the AD converter 448 to effect conversion of the analog sensor data to digital sensor data for filtering and processing by the power distribution unit 444.

The autonomous transport vehicle may include lights 483A (FIG. 5, see also lighting/LED in FIGS. 10A-10C) that are coupled to the frame 200 (or any other location of the autonomous transport vehicle 110) and that illuminate portions of the storage structure 130 adjacent the autonomous transport vehicle 110. The power distribution unit 444 is configured to control operation of the lights 483A. For example, the power distribution unit 444 is configured to provide a pulse width modulation control signal to the lights 483A to actuate the lights 483A in a manner that minimizes power consumption. Here, the pulse width modulation control signal is configured to minimize an amount of power drawn from the power supply 481 for illuminating the lights 483A for a given autonomous transport vehicle task (e.g., reading a barcode with the vision system 400, detecting case unit features with the vision system, illumination of a portion of the storage and retrieval system 100 for remote operator viewing effected by the vision system (such as described in U.S. provisional patent application titled "Autonomous Transport Vehicle with Vision System" and having U.S. provisional patent application No. 63/232,546 filed on Aug. 12, 2021, the disclosure of which was previously incorporated herein by reference in its entirety), etc.). The lights 483A may be any suitable lights including but not limited to light emitting diodes (LED).

Still referring to FIGS. 2, 4, 5, 10A-10C, and 11, the power distribution unit 444 is configured to manage power needs of the autonomous transport vehicle 110 so as to preserve higher level functions/operations of the autonomous transport vehicle 110. The power distribution unit 444 is configured so as to comprehensively manage a demand charge level of each respective branch power circuit 482 (on which respective branch devices 483A-483F . . . 483$n$ (collectively referred to as branch devices 483, where n denotes an integer representing a maximum number of branch devices) are disposed—see FIGS. 4, 5, 6, 10A-10C and 11) switching off each of the branch power circuits 482 in a predetermined pattern based on the demand level of each respective branch circuit with respect to other branch power circuits 482 and the charge level available from the power supply 481. The predetermined pattern (e.g., for switching off the branch power circuits 482) is arranged to switch off branch power circuits 482 with a decrease in the available charge level from the power supply 481, so as to maximize available charge level from the power supply 481 directed to the controller 122. The predetermined pattern is arranged to switch off the branch power circuits 482 with the decrease in the available charge level from the power supply 481 so that the available charge level directed to the controller 122 is equal to or exceeds the demand charge level of the controller 122 for a maximum time based on the available charge level of the power supply 481 (e.g., to preserve operation of the controller 122).

As an example of branch power circuit 482 shut down and preservation of controller 122 operation, the monitoring device 447 of the power distribution unit 444 is configured to monitor the voltage of the power supply 481 (FIG. 8, Block 800) as described herein and shut down components/systems (e.g., analog sensors, digital sensors drive systems, communications systems, etc.) of the autonomous transport vehicle 110 in a sequenced shutdown order where the each shutdown operation in the sequenced shutdown order depends on a respective threshold voltage of the power supply. For example, the power supply 481 power supply has a fully charged voltage of V1. With the power distribution unit 444 detecting the voltage V1 the components/systems of the autonomous transport vehicle 110 are substantially fully operational to effect transport of case units throughout the storage structure 130.

With operation of the autonomous transport vehicle 110, the voltage of the power supply 481 may drop (and the power distribution unit 444 detects such voltage drop) to a first predetermined threshold voltage V2 (where V2 is less than V1). The power distribution unit 444 monitoring the power supply 481 voltage detects that power supply voltage drops to a voltage equal to about the first predetermined threshold voltage V2 (FIG. 8, Block 810); and with the power supply 481 voltage at about the first predetermined threshold voltage V2 the power distribution unit 444 may operate the switches 449S to remove power from (e.g., shut down) branch power circuits 482 corresponding to case unit handling components/systems (e.g., arm extension drives 667, payload justification drives 668, arm lift drives 669, case unit sensors, arm/case unit justification position sensors, suspension locks, etc.) of the autonomous transport vehicle 110 (FIG. 8, Block 820) so that remaining power of the power supply 481 may be employed to effect traverse of the autonomous transport vehicle to a charging station/location or other predetermined location within the storage structure 130. In aspects where power supply 481 charge is not sufficient to complete traverse of the autonomous transport vehicle 110 to a charging station, the controller 122 may effect traverse of the autonomous transport vehicle to a safe location as described herein (e.g., a predetermined location of the storage and retrieval system where the autonomous vehicle may be accessed by an operator for maintenance or removal from the storage structure 130). Suitable examples of charging stations that may be disposed in the storage and retrieval system are described in U.S. Pat. No. 9,469,208 titled "Rover Charging System" and issued on Oct. 18, 2016; U.S. Pat. No. 11,001,444 titled "Storage and Retrieval System Rover Interface" and issued on May 11, 2021; and U.S. patent application Ser. No. 14/209,086 titled "Rover Charging System" and filed on Mar. 13, 2014, the disclosures of which are incorporated herein by reference in their entireties.

Figure 8:
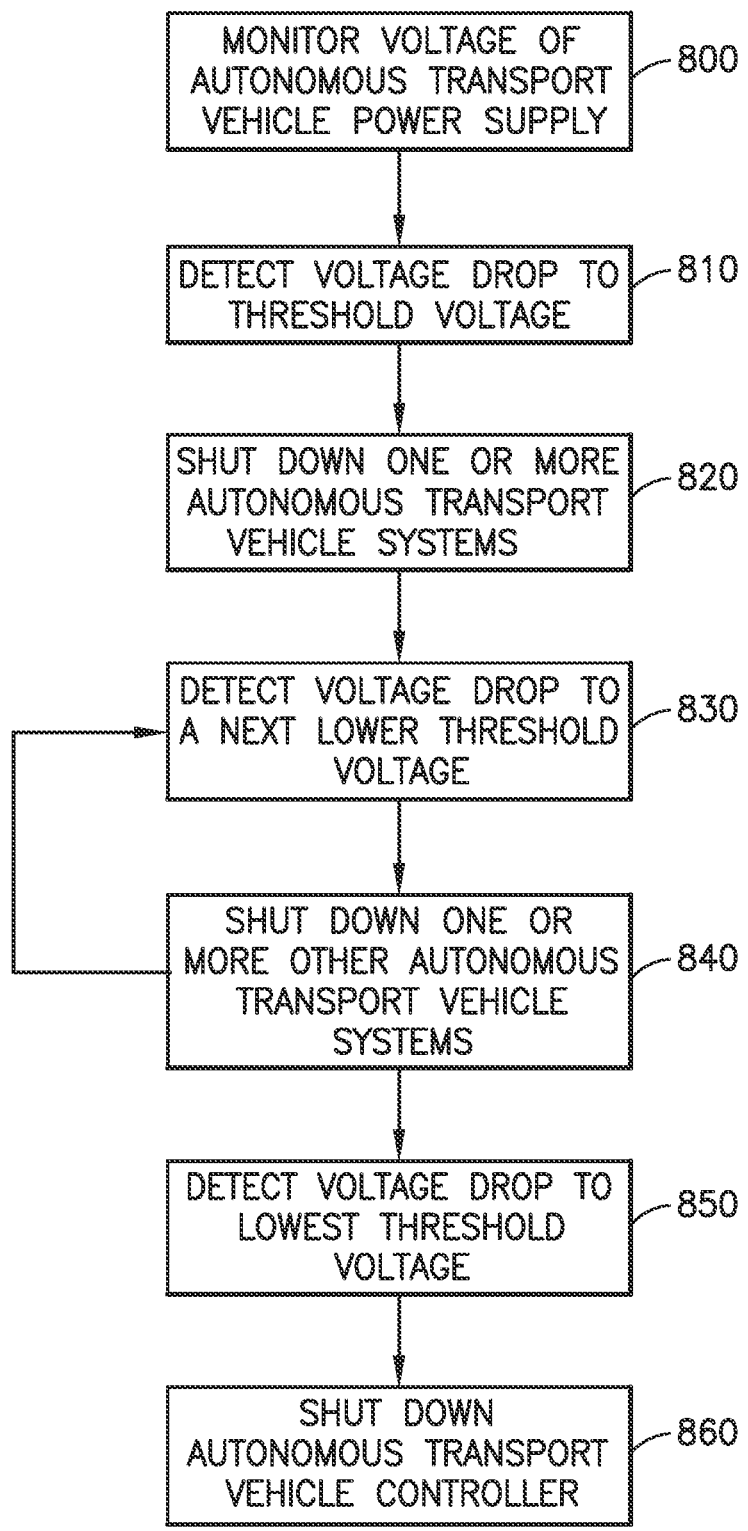
FIG. 8 is an exemplary flow diagram in accordance with aspects of the disclosed embodiment.

The power distribution unit 444 continues to monitor the voltage of the power supply 481 for a drop in the power supply voltage to a subsequent (e.g., next) lower threshold voltage (FIG. 8, Block 830). For example, where a threshold voltage of the power supply 481 of V3 (where V3 is less than V2) is detected by the power distribution unit 444, the power distribution unit 444 operates the switches 449S to remove power from (e.g., shut down) branch power circuits 482 (such as circuits 483D, 483F) corresponding to drives/systems that effect vehicle traverse (e.g., the right and left drive/traction wheels 260A, 260B (FIGS. 2 and 6), caster wheel steering drives 600M (FIG. 2), traction control system 666 (FIG. 6), sensors and sensor controllers effecting vehicle navigation (e.g., vision system, line following sensors, etc. such as provided with sensor system 270) (FIG. 8, Block 840) so that remaining power of the power supply 481 may be employed to effect operation of the controller 122 of the autonomous transport vehicle 110. Here, primary communications between the autonomous transport vehicle 110 and the control server 120 and/or an operator may also be shut down to preserve power for the controller 122. As described above, the communications module 445 of the power distribution unit 444 operates to maintain a secondary communications channel between the controller 122 and the control server 120 and/or an operator (e.g., via the laptop, smart phone/tablet, etc.).

As above, the power distribution unit 444 continues to monitor the voltage of the power supply 481 for the next subsequent lower threshold voltage (FIG. 8, Block 850). For example, where a threshold voltage V4 (where V4 is less than V3) of the power supply 481 is detected by the power distribution unit 444, the power distribution unit 444 is configured to initiate shutting down of the controller 122 (FIG. 8, Block 860) so that the controller 122 (and its software) is not adversely affected by a loss of power or an under-voltage/under-current failure. Here, the controller 122 is configured so that upon indication from (e.g., a prediction by) the power distribution unit 444 of imminent decrease in available charge level, directed from the power supply 481 to the controller 122, to less than a demand level of the controller 122, the controller 122 enters suspension of operation and hibernation. With the controller 122 in suspension and hibernating (e.g., shut down) the power distribution unit 444 may also shut itself down so that substantially all operations of the autonomous transport vehicle 110 are suspended.

It is noted that the threshold voltage V4 is described above as the "lowest threshold voltage" such that detection of the threshold voltage V4 initiates shutdown of the controller 122. However, it should be understood that the above shut down sequence effected by the power distribution unit 444 is exemplary only and in other aspects there may be any suitable number of threshold voltages at which any suitable number of corresponding vehicle components/systems are shut down to preserve power of the power supply 281. For example, Blocks 830 and 840 of FIG. 8 may be repeated in a loop until the next to lowest threshold voltage is reached. Here, each threshold voltage in the descending values of threshold voltages is known to the power distribution unit 444 (such as stored in memory 446 and accessible by the monitoring device 447) such that the loop ends when the next to lowest threshold voltage is reached.

Still referring to FIGS. 2, 4, 5, 10A-10C, and 11 another exemplary shutdown operation will be described. Here the autonomous transport vehicle 110 has a power supply 481 with a fully charged voltage of about 46V (in other aspects the fully charged voltage may be more or less than about 46V). The power distribution unit 444 monitors the voltage output by the power supply 481 during autonomous transport vehicle 110 operation in a manner similar to that described above with respect to FIG. 8. Here, with the power supply 481 output at a threshold voltage of about 22V (in other aspects the output voltage may be more or less than about 22V) the power distribution unit 444 operates the switches 449S to disable the traction motors 261M and other features (e.g., sensors associated with navigation/traverse of the autonomous transport vehicle) of the autonomous transport vehicle so that driving of the autonomous transport vehicle is disabled.

The power distribution unit 444 continues to monitor the output voltage of the power supply 481 for the next lowest threshold voltage of about 20V (in other aspects the output voltage may be more or less than about 20V). Upon detection of the threshold voltage of about 20V, the power distribution unit 444 effects, through the controller 122, positioning of any case units CU carried by the autonomous transport vehicle 110 to a known safe state (e.g., retracted into the payload bed 210B in a predetermined justified location) within the payload bed 210B. In other aspects, where the autonomous transport vehicle 110 is located in front of a predetermined destination/place location for the case unit(s) CU being carried by the autonomous transport vehicle 110, the controller 122 may effect extension of the transfer arm 210A to place the case unit(s) CU at the destination location rather than retract the case unit(s) CU into the payload bed 210B (noting that after placement of the case unit(s) CU the transfer arm 210A is retracted within the payload bed 21B to a safe/home position).

The power distribution unit 444 is configured to operate the switches 499S, upon detection of the next lowest threshold voltage of about 18V of the power supply 481 (in other aspects the output voltage may be more or less than about 18V), so as to shut down the vision system 400 and other 24V peripheral power supplies (e.g., including but not limited to case detection sensors, vehicle localization sensors, hot swap circuitry, etc.). Upon detection of the next lowest power supply 481 output threshold voltage of about 14V (in other aspects the output voltage may be more or less than about 14V) the power distribution unit 444 is configured to operate the switches 499S to disable onboard and off-board communications (e.g., wireless communications module 445 and onboard Ethernet communications) of the autonomous transport vehicle 110. The power distribution unit 444 continues to monitor the power supply 481 output voltage for the next lowest threshold voltage of about 12V (in other aspects the output voltage may be more or less than about 12V), and upon detection of the about 12V output voltage the power distribution unit 444 turns off lighting (e.g., LEDs) of the autonomous transport vehicle 110 and provides command signals to the controller 122 so that the controller 122 is placed into hibernation/sleep as described above. Upon detection of the lowest power supply 481 output threshold voltage of about 10V (in other aspects the output voltage may be more or less than about 10V) by the power distribution unit 444, the power distribution unit 444 effects a complete shutdown of the autonomous transport vehicle 444 such that the controller 122, the vision system controller 122VC, and other suitable programmable devices (e.g., FPGAs, CPLDs, SOCs, CPUs, etc.) of the autonomous transport vehicle 110 are turned off/shut down.

The monitoring device 447 is configured to substantially continuously (e.g., with the autonomous transport vehicle 110 in operation) monitor power supply 481 operation and status. For example, the monitoring device 447 is configured to substantially continuously (or at any suitable predetermined time intervals) monitor a voltage of the power supply 481 (e.g., with any suitable voltage sensors) and communicate a low voltage condition (e.g., the voltage has dropped below a predetermined voltage level) to the controller 122 so that the controller 122 may effect a safe state of the autonomous transport vehicle 110. For example, the controller 122 is configured (e.g., via the monitoring device 447) so that upon indication from the power distribution unit 444 of imminent decrease in available charge level of the power supply 481, directed from the power supply 481 to the branch power circuit of the drive section 261D (see FIG. 6), the controller 122 is configured to command the drive section 261D so as to navigate the autonomous transport vehicle 110 along a predetermined auxiliary path AUXP and auxiliary trajectory AUXT (known as safe, non-conflicting with other vehicles 110, not impedimental nor blocking other vehicle paths, pass through nor destination location—see FIG. 1B) to a predetermined bot auxiliary stop location 157 in the storage and retrieval facility (e.g., structure) 130. The predetermined auxiliary stop location 157 is a safe, uncongested area of a transport deck 130B or picking aisle 130A or a human access zone (such as described in U.S. Pat. No. 10,088,840 titled "Automated Storage and Retrieval System with Integral Secured Personnel Access Zones and Remote Rover Shutdown" issued on Oct. 2, 2018, the disclosure of which is incorporated herein by reference in its entirety).

The controller 122 is configured so that upon indication from the power distribution unit 444 of imminent decrease in available charge level of the power supply 481, directed from the power supply 481 to the branch circuit of the payload handling section 210 (see FIG. 6) the controller 122 is configured to command the payload handling section 210 to move the payload handling actuator or transfer arm 210A (e.g., via one or more of arm extension drives 667 and arm lift drives 669), and any payload thereon (e.g., via payload justification drives 668), to a predetermined safe payload position in the payload bed 210B. The safe payload position may be such that the payload does not overhang outside of the payload bed and is securely held within the payload bed 210B.

Referring to FIGS. 1A, 1B, 2, 4, 5, and 6, as described herein the controller 122 may also be configured to actively monitor a health status of the autonomous transport vehicle 110 and effect onboard diagnostics of vehicle systems. As an example, vehicle system health is monitored in any suitable manner such as by monitoring current used and fuse status of the vehicle systems (and the branch power circuits 482 of which the branch devices 483 are a part). Here the controller 122 includes at least one of a vehicle health status monitor 447V, a drive section health status monitor 447D, a payload handling section health monitor 447H, and a peripheral electronics section health monitor 447P. The vehicle health status monitor 447V, the drive section health status monitor 447D, the payload handling section health monitor 447H, and the peripheral electronics section health monitor 447P may be sections of the monitoring device 447. The controller also includes a health status register section 447M, which may be a section of the memory 446 (or memory 122M or any other suitable memory accessible by the controller 122).

The vehicle health status monitor 447V may monitor dynamic responses of the frame 200 and wheel suspension, such as with any suitable vehicle health sensors (such as accelerometers) coupled to the frame (e.g., such as described in U.S. provisional patent application No. 63/213,589 titled "Autonomous Transport Vehicle with Synergistic Vehicle Dynamic Response" and filed on Jun. 22, 2021, the disclosure of which is incorporated herein by reference in its entirety). Where a dynamic response is outside of a predetermined range the vehicle health status monitor 447V may effect (through controller 122) a maintenance request (e.g., presented on user interface UI) to an operator of the storage and retrieval system 100. In other aspects, any suitable characteristics of the vehicle may be monitored by the vehicle health status monitor 447V.

The drive section health status monitor 447D may monitor power drawn by the motors 261M of the drive section 261D, drive section sensor (e.g., wheel encoders, etc.) status, and a status of the traction control system 666. Where the power usage of the motors 261M, drive section sensor responsiveness, and/or a traction control system response is outside of predetermined operating characteristics the drive section health status monitor 447D may effect (through controller 122) a maintenance request (e.g., presented on user interface UI) to an operator of the storage and retrieval system 100.

The payload handling section health monitor 447H may monitor power drawn by the motors (e.g., extension lift, justification, etc.) of the case handling assembly 210 and a status of the case handling assembly sensors. Where the power usage of the case handling assembly motors and/or a case handling assembly sensor response is outside of predetermined operating characteristics the payload handling section health monitor 447H may effect (through controller 122) a maintenance request (e.g., presented on user interface UI) to an operator of the storage and retrieval system 100.

The peripheral electronics section health monitor 447P may monitor the sensor system 270 and the at least one peripheral motor 777. Where the power usage of at least one peripheral motor 777 and/or a sensor (of the sensor system 270) response is outside of predetermined operating characteristics the peripheral electronics section health monitor 447P may effect (through controller 122) a maintenance request (e.g., presented on user interface UI) to an operator of the storage and retrieval system 100.

As a non-limiting example of health monitoring, the power distribution unit 444 is configured to monitor current in the branch power circuits 482 (in any suitable manner, such as directly with ammeters or indirectly by monitoring voltage and/or resistance of the respective branch power circuits 482) and a status of the respective fuses 484 of the branch power circuits 482. Real-time feedback (e.g., input data relating to current and fuse status is processed by the monitoring device 447 within milliseconds so that the processed data it is available substantially immediately as feedback) is provided to one or more of the controller 122 and control server 120 to effect autonomous transport vehicle 110 operator and/or service/maintenance requests.

The real time feedback effected by the monitoring device 447 monitoring at least the branch power circuit 482 current and fuse 484 status provides for onboard diagnostics and health monitoring of the autonomous transport vehicle systems. The power distribution unit 444 is configured to detect the fuse 484 status (e.g., inoperable or operable) based on, for example current of the respective branch power circuit 482. Where there is an absence of current detected in the respective branch power circuit 482 the monitoring device 447 determines that the fuse 484 is inoperable and in need of service, otherwise where current is detected the fuse 484 is operable (i.e., a fault state (see, e.g., FIG. 5) is detected). The monitoring device 447 provides the fuse status (e.g., fault state) as feedback to, for example, the control server 120 and/or an operator through the communications module 445 so that servicing of the autonomous transport vehicle 110 can be scheduled. As may be realized, the power distribution unit 444 is configured to monitor each branch power circuit 482 separately from each other power branch power circuit 482 so that where a fuse is determined to be inoperable the monitoring device 447 also identifies the branch power circuit 482 of which the fuse is a part so as to reduce downtime and troubleshooting of the autonomous transport vehicle 110 for fuse 484 replacement.

An increased current within a branch power circuit, as detected by the monitoring device 447 may be indicative of an impending drive motor fault, an impending bearing fault, or other impending electrical/mechanical fault. As noted above, each branch power circuit is monitored separately so that where an increased current is detected the corresponding branch power circuit 482 is also identified. The monitoring device 447 provides the increased current value (e.g., fault state) and identifies the branch power circuit 482 with the overcurrent therein to, for example, the control server 120 and/or an operator through the communications module 445 so that servicing of the autonomous transport vehicle 110 can be scheduled.

The power distribution unit 444 is configured to monitor voltage regulators 490, branch device central processing units (CPUs) 491, and/or position sensors 492 of peripheral devices (e.g., such as transfer arm 210A, payload justification pushers/pullers, wheel encoders, navigation sensor systems (as described herein), payload positioning sensor systems (as described herein) (it is noted that suitable examples of payload justification pushers/pullers are described in, for example U.S. provisional patent application No. 63/236,591 filed on Aug. 24, 2021 and titled "Autonomous Transport Vehicle" as well as United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which were previously incorporated herein by reference in their entireties). As an example, the monitoring device 447 is configured to monitor communications between the position sensors 492 and the controller 122, communications between the branch device controller(s) 491 and the controller 122, and the voltage from the voltage regulators 490. Where communication is expected from a sensor 492 and/or branch device controller 491 the monitoring device 447 may register a fault (e.g., time stamped) in the memory 446 and communicate such fault state (e.g., with the communications module 445 to the control server 120 and/or operator effecting a maintenance request. Where the branch device 483/branch power circuit 482 from which the fault is obtained is of a lower operational importance, the monitoring unit 447 may continue to monitor and register faults from the branch device 483/branch power circuit 482 and send a service requested message to the control server 120 or operator depending on a frequency of the faults or any other suitable criteria.

As another example, the monitoring device 447 is configured to monitor a voltage of a voltage regulator 490 for one or more power branch circuits 482 in any suitable manner (such as feedback from the voltage regulator or voltmeter). Where there is an over-voltage or under-voltage detected by the monitoring device 447 the monitoring device 447 may register a fault (e.g., time stamped) in the memory 446 and communicate such fault state (e.g., with the communications module 445 to the control server 120 and/or operator effecting a maintenance request. Where the branch device 483/branch power circuit 482 from which the fault is obtained is of a lower operational importance, the monitoring unit 447 may continue to monitor and register faults from the voltage regulator 490 and send a service requested message to the control server 120 or operator depending on a frequency of the faults or any other suitable criteria (such as a magnitude of the over-voltage or under-voltage).

Still referring to Referring to FIGS. 1A, 1B, 2, 4, 5, and 6, the power distribution device 444 of the controller 122 is configured as a boot device so that at autonomous transport vehicle 110 cold startup (initialization) the monitoring device 447 is brought online before other sections of the controller 122 and vision system controller 122VC so as to set initial (safe) states of the autonomous transport vehicle 110 prior to boot-up of the controller 122 and vision system controller 122VC. To effect initialization of the autonomous transport vehicle 110 the controller 122 is configured so that upon indication from the power distribution unit 444 of imminent decrease in available power supply charge level, directed from the power supply 481 to the controller 1222, to less than a demand level of the controller 122, the controller 122 configures at least one of the autonomous guided vehicle state and pose navigation information and the payload identity, state, and pose information, held in respective registry and memory (e.g., such as memory 446 or other memories 122M of corresponding ones of the autonomous navigation control section 122N, the autonomous payload handling control section 122H, and the vision system control section (e.g., vision system controller 122VC)), into an initialization file 122F (FIG. 2) available on reboot of the controller 122. The controller 122 may also be configured so that upon indication from the power distribution unit 444 of imminent decrease in available power supply charge level, directed from the power supply 481 to the controller 122, to less than a demand level of the controller 122, to configure stored health status information from the at least one of the vehicle health status monitor 447V, the drive section health status monitor 447D, the payload handling section health monitor 447H, and the peripheral electronics section health monitor 447P in the health status register section 447M (such as in memory 122M or memory 446) into an initialization file 122F available on reboot of the controller 122.

On initialization of the autonomous transport vehicle. the monitoring device 447 of the power distribution unit 444 is configured to control power up sequencing of the controller 122 sections (e.g., the autonomous navigation control section 122N, the autonomous payload handling control section 122H, and vision system controller 122VC), and branch devices 483 (e.g., sensors, drive motors, caster motors, transfer arm motors, justification device motors, payload bed 210B motors, etc.). The sequencing may be that the vision system controller 122VC is powered up before the autonomous navigation control section 122N and the branch devices are powered up last; however, in other aspects any suitable power sequence may be employed such that control devices are powered up before the devices they control.

Figure 12:
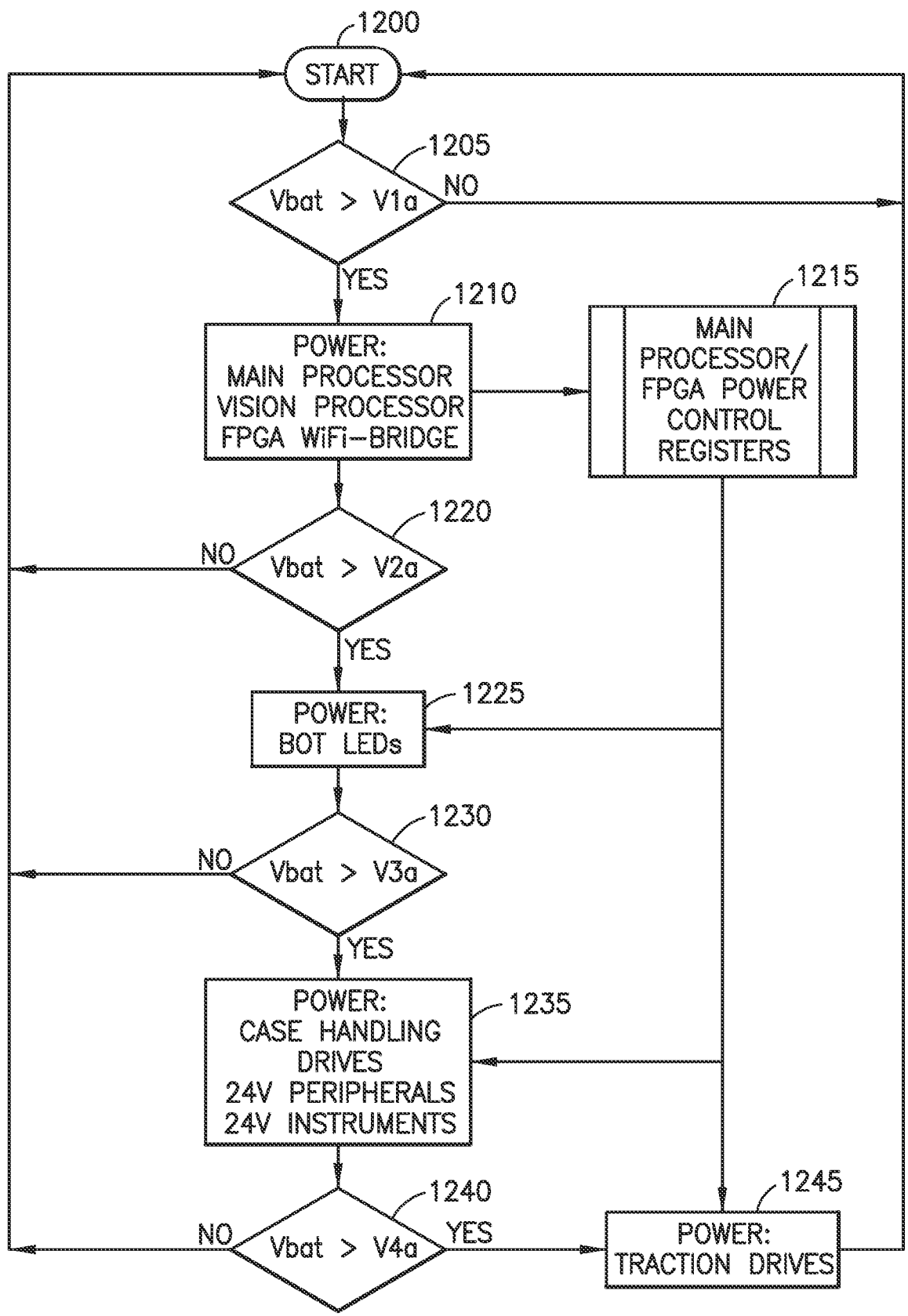
FIG. 12 is an exemplary flow diagram in accordance with aspects of the disclosed embodiment.

Referring also to FIG. 12, an exemplary autonomous transport vehicle 110 power up or cold startup process will be described with the power distribution device 444 as a boot device. Here, power to the autonomous transport vehicle 110 is turned on (FIG. 12, Block 1200) and the power distribution device 444 monitors the output voltage of the power supply 481 and determines if the output voltage is greater than a startup threshold voltage Via (FIG. 12, Block 1205) of about 16V (in other aspects the startup threshold voltage Via may be more or less than about 16V). Where the power supply 481 output voltage is greater than the startup threshold voltage Via the power distribution unit 444 operates switches 499S so that power is provided to, for example, the controller 122, the vision system controller 122VS, the wireless communications module 445, and the other suitable programmable devices (e.g., FPGAs, CPLDs, SOCs, CPUs, etc.) of the autonomous transport vehicle 110 (FIG. 12, Block 1210). Here, the initialization file 122F (described above) may be employed on startup of the controller 122, the vision system controller 122VS, the wireless communications module 445, and the other suitable programmable devices (e.g., FPGAs, CPLDs, SOCs, CPUs, etc.) (FIG. 12, Block 1215) so that startup and operation of the controlled devices is effected based on information in the initialization file 122F.

The power distribution unit 444 continues to monitor the voltage output by the power supply 481 and where the output voltage is detected as being above a next higher startup threshold voltage V2a (FIG. 12, Block 1220) of about 18V (in other aspects the startup threshold voltage V2a may be more or less than about 18V), the power distribution unit 444 operates switches 449S to turn on the lighting (e.g., LEDs—see FIGS. 10A-10C) of the autonomous transport vehicle 110 (FIG. 12, Block 1225). Where the next higher startup threshold voltage V2a has not been reached the power distribution unit 444 continues to monitor the power supply 481 output voltage until the next higher startup threshold voltage V2a is reached (such as with the autonomous transport vehicle 110 being charged), or until a shutdown sequence is initiated (see FIG. 8 described herein).

With the power distribution unit 444 continuing to monitor the voltage output of the power supply 481, and with a next higher startup threshold voltage V3a detected by the power distribution unit (FIG. 12, Block 1230), the power distribution unit 444 operates the switches 449S so as to power up/turn on the case handling drives of, for example, the front and rear justification module 210ARJ, 210AFJ, payload bed 210B, and transfer arm 210A (FIG. 12, Block 1235) as well as 24V peripherals and instruments (see FIGS. 10A-10C) of the autonomous transport vehicle 110. Here, the threshold voltage V3a may be about 24V but in other aspects the threshold voltage V3a may be more or less than about 24V. If the voltage output of the power supply 481 is less than about 24V the power distribution unit 444 continues to monitor the power supply 481 output voltage until the next higher startup threshold voltage V3a is reached (such as with the autonomous transport vehicle 110 being charged), or until a shutdown sequence is initiated (see FIG. 8 described herein).

With the power distribution unit 444 monitoring the voltage output of the power supply 481, and with detection of a next higher startup threshold voltage V4a (FIG. 12, Block 1240), the power distribution unit 444 operates the switches 449S so as to power up/turn on the traction drive motors 261M (FIG. 12, Block 1245). Here, the threshold voltage V4a may be about 28V but in other aspects the threshold voltage V4a may be more or less than about 28V. Where the voltage output of the power supply 481 is less than about 28V the power distribution unit 444 continues to monitor the power supply 481 output voltage until the next higher startup threshold voltage V4a is reached (such as with the autonomous transport vehicle 110 being charged), or until a shutdown sequence is initiated (see FIG. 8 described herein).

As may be realized, where the threshold voltage V4a is detected by the power distribution unit 444 at cold start of the autonomous transport vehicle 110, the power distribution unit 444 is configured (e.g., with any suitable non-transitory computer program code) to power up the components of the autonomous transport vehicle 110 in the manner/sequence described above with respect to FIG. 12. Here, the power distribution unit 444 is configured so that control devices are powered up before the devices they control.

Referring to FIGS. 2, 4, 5, 6, and 13, as described herein, the controller 122 may be configured to effect one or more of onboard power supply charge mode, active control of inrush current to branch devices 483 (e.g., lower level system of the autonomous transport vehicle), and regenerative power supply 481 charging.

Figure 6:
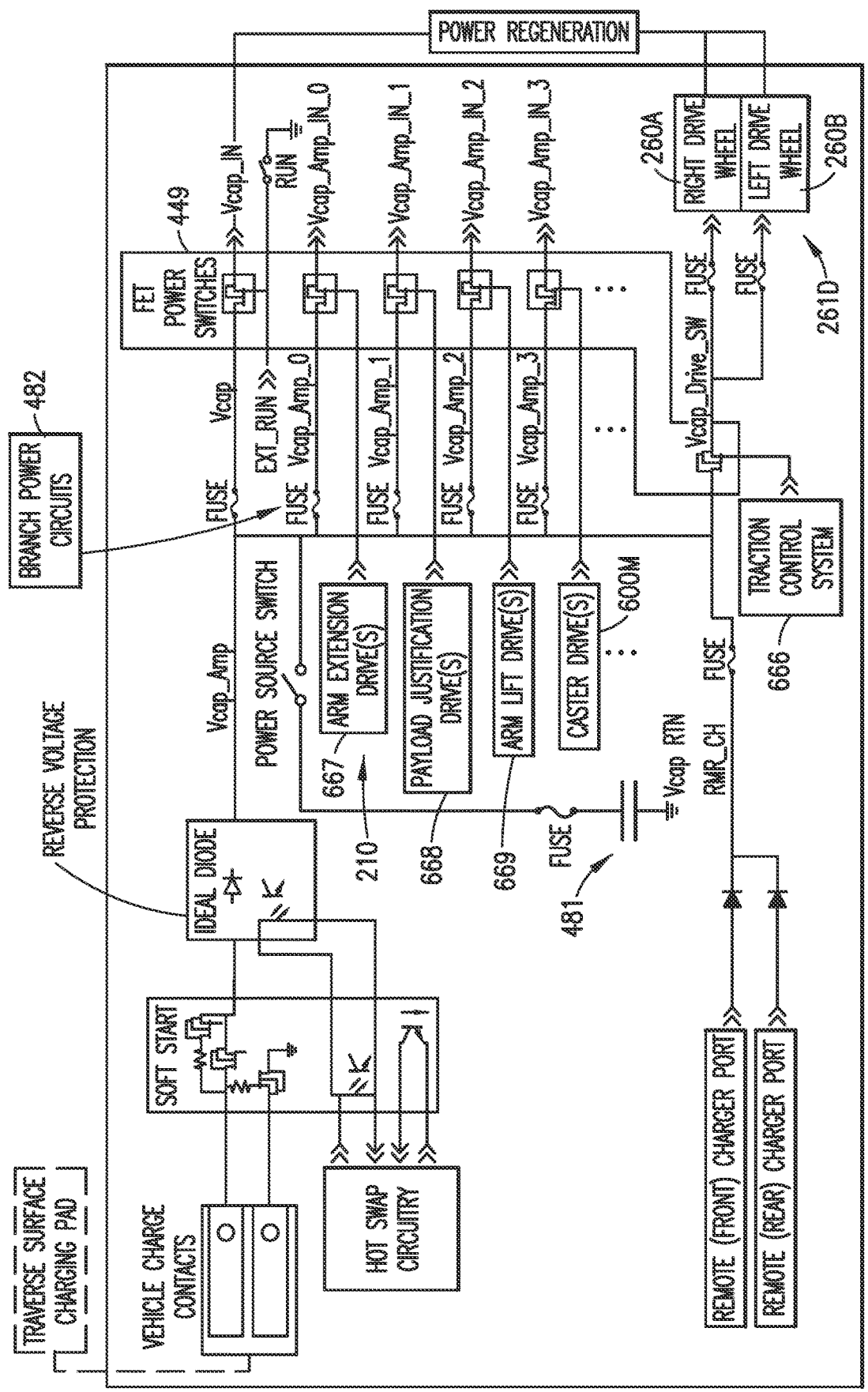
FIG. 6 is an exemplary schematic charging logic block diagram for the autonomous transport vehicle of FIG. 2 in accordance with aspects of the disclosed embodiment.
Figure 13:
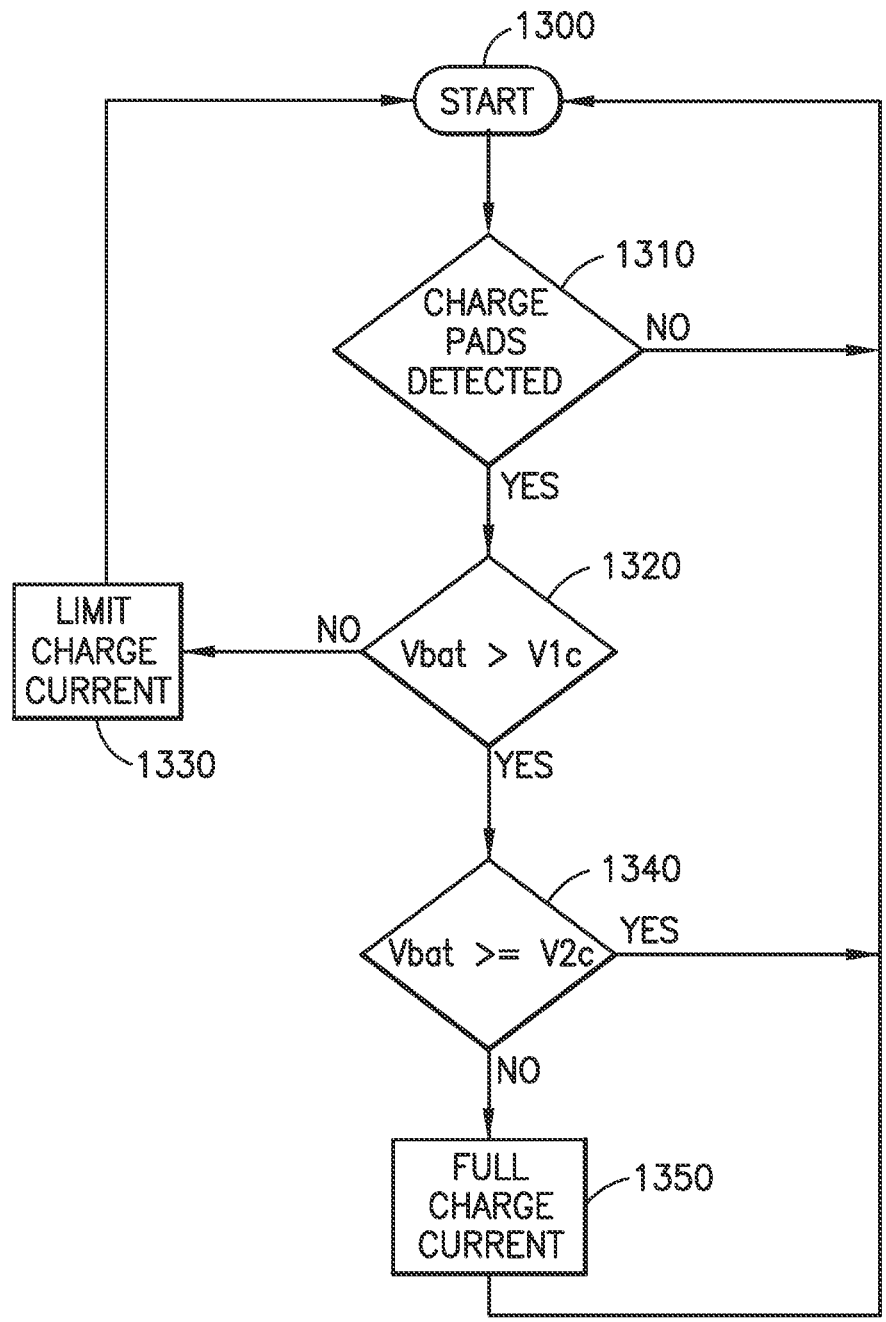
FIG. 13 is an exemplary flow diagram in accordance with aspects of the disclosed embodiment.

With the autonomous transport vehicle 110 at a charging station (FIG. 13, Block 1300) power distribution unit 444 detects the presence of the traverse surface charging pad(s) (see FIG. 6 and FIG. 13, Block 1310). The power distribution unit 444, as described herein, is configure to monitor the output voltage of the power supply 481 and effect control tasks based on the output voltage level. Here, control of power supply 481 charging is based on the output voltage of the power supply 481 detected by the power distribution unit 444. Here, the monitoring device 447 of the power distribution unit 444 is configured to control a low level charging logic of the autonomous transport vehicle 110. An exemplary charging logic block diagram for the power distribution unit 444 is illustrated in FIG. 6. As can be seen in FIG. 6, the autonomous transport vehicle 110 is configured with vehicle mounted charging contacts that receive charging current from a charging pad located on a traverse surface of the transfer deck 130B, picking aisle 130A, and/or any other suitable traverse surface of the storage and retrieval system on which the autonomous transport vehicle 110 travels. The traverse surface mounted charging pad and the vehicle mounted charging contacts are substantially similar to that described in U.S. Pat. No. 9,469,208 titled "Rover Charging System" and issued on Oct. 18, 2016; U.S. Pat. No. 11,001,444 titled "Storage and Retrieval System Rover Interface" and issued on May 11, 2021; and U.S. patent application Ser. No. 14/209,086 titled "Rover Charging System" and filed on Mar. 13, 2014). The autonomous transport vehicle 110 may also be configured with remote charging ports mounted to the front end 200E1 or rear end 200E2 of the frame 200 that engage (e.g., plug into) corresponding charge ports mounted to the storage structure 130 or a hand-held plug which an operator plugs into the remote charging ports of the autonomous transport vehicle 110.

The monitoring device 447 controls a charge mode/rate of the power supply 481 so as to maximize a number of charge cycles of the power supply 481. For example, the monitoring device 447 is configured to effect one or more of a trickle charge mode (e.g., having a charge rate below a set threshold voltage), a slow charge mode, and an ultra-high-speed (e.g., high current) charge mode, where the charging current is limited by the monitoring device 447 to a set maximum charge voltage threshold to substantially prevent adverse effects on the power supply 481 from charging. Here the charging current and voltage may be dependent on a capacity of and type of the power supply 481. The power supply 481 may have any suitable voltage and charge capacity and may be an ultra-capacitor or any other suitable power source (e.g., lithium ion battery pack, lead acid battery pack, etc.). As can also be seen in FIG. 6, the autonomous transport vehicle 110 includes suitable active reverse voltage protection for the power supply 481.

As an example, of charge rate control, with the vehicle charge contacts coupled with the traverse surface charging pad (see FIG. 6), the power distribution unit 444 detects that the output voltage from the power supply 481 is below a threshold charging voltage V1c (FIG. 13, Block 1320) of about 23V (in other aspects the threshold charging voltage V1c may be more or less than 23V), the monitoring device 477 of the power distribution unit 444 effects a limited current charging of the power supply 1330. For example, the limited charging current may be the slow charging mode described above. The slow charge charging mode described above may have a charge current higher than that of the trickle charging mode but lower than a full charge current. The power distribution unit 444 continues to monitor the output voltage of the power supply 481 during charging and with the detection of the output voltage of the power supply 481 being at or equal to the threshold charging voltage V1c (FIG. 13, Block 1320), the monitoring device 477 of the power distribution unit 444 effects another charging mode, such as the full charge current mode (FIG. 13, Block 1350). The power distribution unit 444 monitors the output voltage of the power supply 481 during charging at full charge current and where the output voltage is at or greater than a next higher threshold charging voltage V2c (FIG. 13, Block 1340) of about 44V (in other aspects the output voltage may be more or less than about 44V), the monitoring device 477 of the power distribution unit 444 terminates charging. In other aspects, upon detection of the output voltage being at or greater than about 44V, the monitoring device 477 may effect the trickle charge mode so as to maintain the power supply 481 at peak/maximum charge with the vehicle charge contacts of autonomous transport vehicle 110 engaged/coupled with the traverse surface charging pad(s) (see FIG. 6).

Still referring to FIGS. 2, 4, 5, and 6, the autonomous transport vehicle 110 includes one or more of current inrush protection, over voltage/current protection, and under voltage/current protection. For example, the autonomous transport vehicle 110 may include hot swap circuitry (substantially similar to that described in U.S. Pat. No. 9,469,208 titled "Rover Charging System" and issued on Oct. 18, 2016; U.S. Pat. No. 11,001,444 titled "Storage and Retrieval System Rover Interface" and issued on May 11, 2021; and U.S. patent application Ser. No. 14/209,086 titled "Rover Charging System" and filed on Mar. 13, 2014) that is configured to effect autonomous transport vehicle 110 roll-on and roll-off of the traverse surface mounted charging pads regardless of an energization status of the traverse surface mounted charging pads. Here, the power distribution unit 444 is configured to actively control inrush current to the branch devices 483A-483F . . . 483n (collectively referred to as branch devices 483, where n denotes an integer representing a maximum number of branch devices) of the respective branch power circuits 482, where the power distribution unit 444 receives from the controller 122 (and the controller 122 is configured to generate) a pulse width modulation signal that effects active control of the switches 449S to limit the inrush current (such as from charging or power surges) to the branch devices 483. For example, at initial contact between the vehicle charging contacts and the traverse surface mounted charging pad the power distribution unit 444 may operate one or more of the switches 449S so as to open the one or more switches to prevent inrush current from flowing to the branch devices 483.

Figure 7:
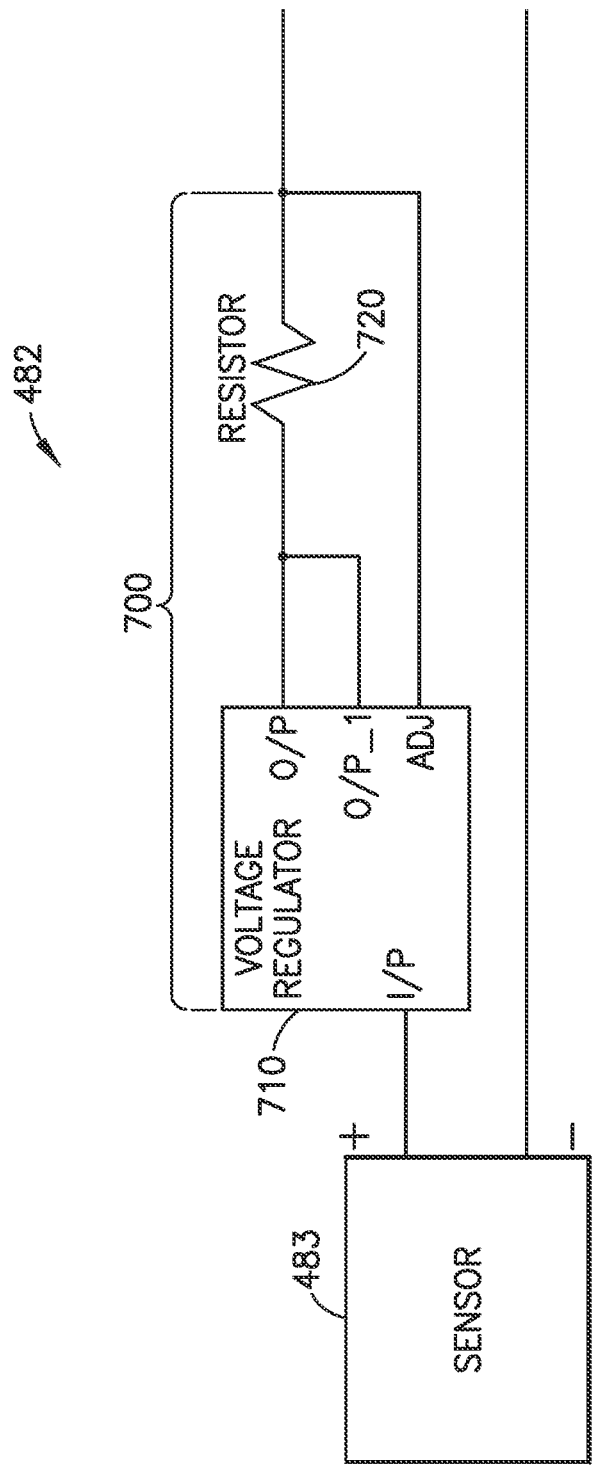
FIG. 7 is an exemplary protection circuit of the autonomous transport vehicle of FIG. 2 in accordance with aspects of the disclosed embodiment.

Referring to FIGS. 2, 4, and 7, one or more of the branch power circuits includes an electrical protection circuit 700 configured to protect the branch device 483 (a sensor is illustrated in FIG. 7 for exemplary purposes but in other aspects any suitable branch device, such as those described herein, may be provided). The electrical protection circuit 700 is configured to substantially protect the branch device 483 (and any controls/measurement instruments devices associated therewith) from, for example, short circuits, overvoltage, and over-current. For example, the branch device 483 (in this example a sensor) operates with an about 4 mA to about 20 mA signal. The electrical protection circuit 700, for exemplary purposes only, includes an adjustable three-terminal positive-voltage regulator 710 and a single resistor 720. The voltage regulator 710 is configured to supply more than about 1.5 A over an output-voltage range of about 1.25 V to about 37 V. The voltage regulator 710 with the resistor 720 coupled thereto limits the current to about 27 mA by leveraging the internal reference voltage of the voltage regulator 710. The insertion of the electrical protection circuit 700 into the branch power circuit 482 substantially does not affect the about 4 mA to about 20 mA signal while providing control/measurement protection to devices disposed both upstream and downstream (with respect to the flow of current) the electrical protection circuit 700. It is again noted that the configuration of the electrical protection circuit 700 is exemplary only and that the electrical protection circuit 700 may be configured with any suitable voltage regulator and resistor (having suitable specifications) for providing control/measurement protection for signal that are less than about 4 mA or more than about 20 mA.

Figure 5:
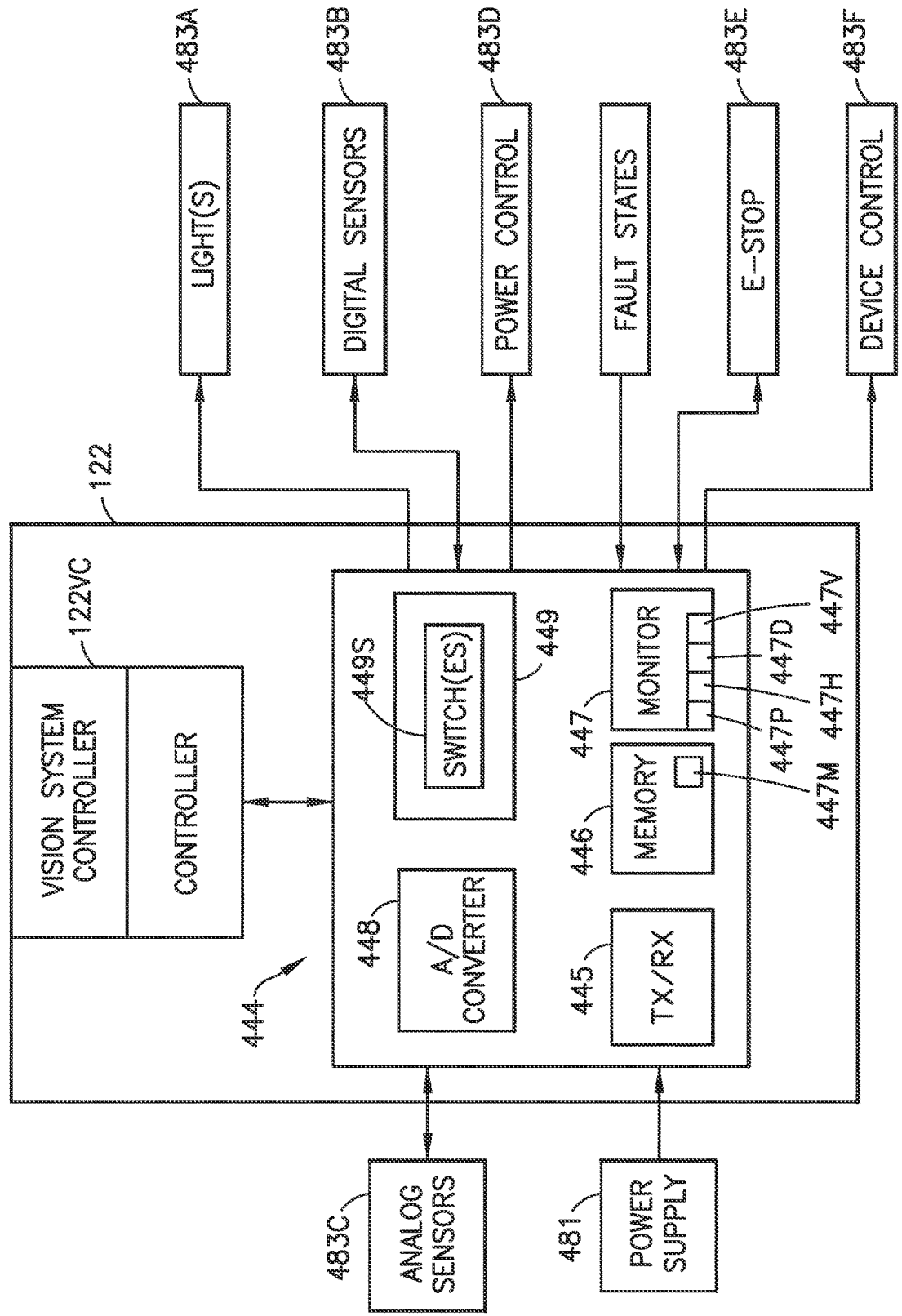
FIG. 5 is an exemplary schematic block diagram of a portion of the autonomous guided vehicle of FIG. 2 in accordance with aspects of the disclosed embodiment.

Referring to FIGS. 4, 5, and 6, the power distribution unit 444 is configured to effect regenerative charging of the power supply 481. For example, with the right and left drive wheels 260A, 260B rolling, but not under power (e.g., such as during braking), the back electromotive force (EMF) voltage produced by the respective motors 261M is fed back into the respective branch power circuit 483E, 483F. The monitoring device 447 may operate the switches 449S (such as the Vcap_IN switch—see FIG. 6) so that the back EMF voltage (and current) regeneratively charges the power supply 481. With the motors 261M under power to drive the drive wheels 260A, 260B the monitoring device 447 may close the Vcap_IN switch to prevent power drain from the power supply 481.

Referring to FIGS. 2, 4, and 5, as described herein, the power distribution unit 444 includes the wireless communication module 445. The wireless communication module 445 may be configured for any suitable wireless communication including, but not limited to, Wi-Fi, Bluetooth, cellular, etc. The wireless commination module 445 configures the power distribution unit 444 so as to control at least in part, for example, communication between the autonomous transport vehicle 110 and other features of the storage and retrieval system including but not limited to the control server 120 over any suitable network such as network 180. Here, the wireless communication module 445 and monitoring device 447 configure the power distribution unit 444 as a secondary processor/controller such as where processing function errors of the controller 122 (e.g., such as safety related functions including remote shutdown, communications or other general component errors) are detected by the monitoring device 447. Where a controller 122 error occurs in communication or control effected by the controller 122, the power distribution unit 444 maintains (secondary) communication between the control server 120 (and operators of the storage and retrieval system 100) and the different components of the autonomous transport vehicle 110 (e.g., through the communication module 445) so that the autonomous transport vehicle 110 can be remotely shut down or driven (either autonomously, semi-autonomously, or under manual remote control of an operator in a manner described in U.S. provisional patent application titled "Autonomous Transport Vehicle with Vision System" and having U.S. provisional patent application No. 63/232,546 filed on Aug. 12, 2021, the disclosure of which was previously incorporated herein by reference in its entirety) so any suitable destination location.

The wireless commination module 445 also provides for "over the air" programming of the of the controller 122, vision system controller 122VC and updating firmware/programming of the monitoring device 447 or other suitable programmable devices (e.g., FPGAs, CPLDs, SOCs, CPUs, etc.) of the autonomous transport vehicle 110. Here an operator of the storage and retrieval system 100 may push or otherwise upload software updates to the autonomous vehicle 110 over the network 180 (which is at least in part a wireless network) through the control server 120 or with other suitable device such as a laptop, smart phone/tablet, etc. The power distribution unit 444 includes any suitable memory 446 that may buffer the software updates for installation in the monitoring device 447, controller 122, vision system controller 122VC and/or other suitable programmable devices (e.g., FPGAs, CPLDs, SOCs, CPUs, etc.).

The wireless commination module 445 of the power distribution unit 444 may also be configured as an Ethernet switch or Bridge. Here, the wireless communication modules 455 of the autonomous transport vehicles 110 travelling throughout the storage structure 130 may form a mesh network. In this manner wireless communications from, for example the control server 122 or other suitable device such as a laptop, smart phone/tablet, etc. may be extended to a range the covers substantially an entirety of the storage structure 130 without dedicated Ethernet switches and bridges being disposed throughout (e.g., mounted to) the storage structure 130 in fixed/predetermined locations.

Figure 9:
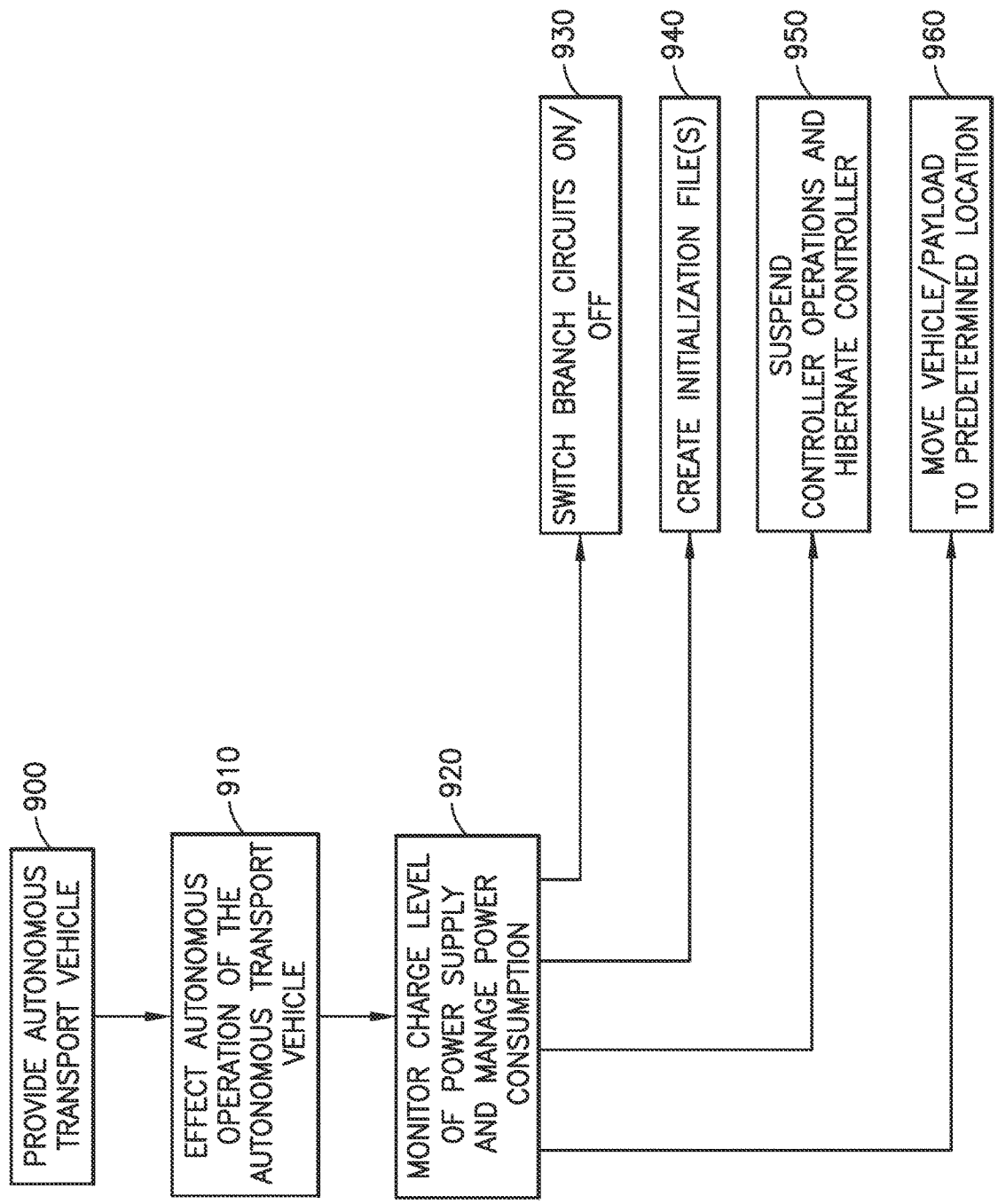
FIG. 9 is an exemplary flow diagram in accordance with aspects of the disclosed embodiment.
Figure 11:
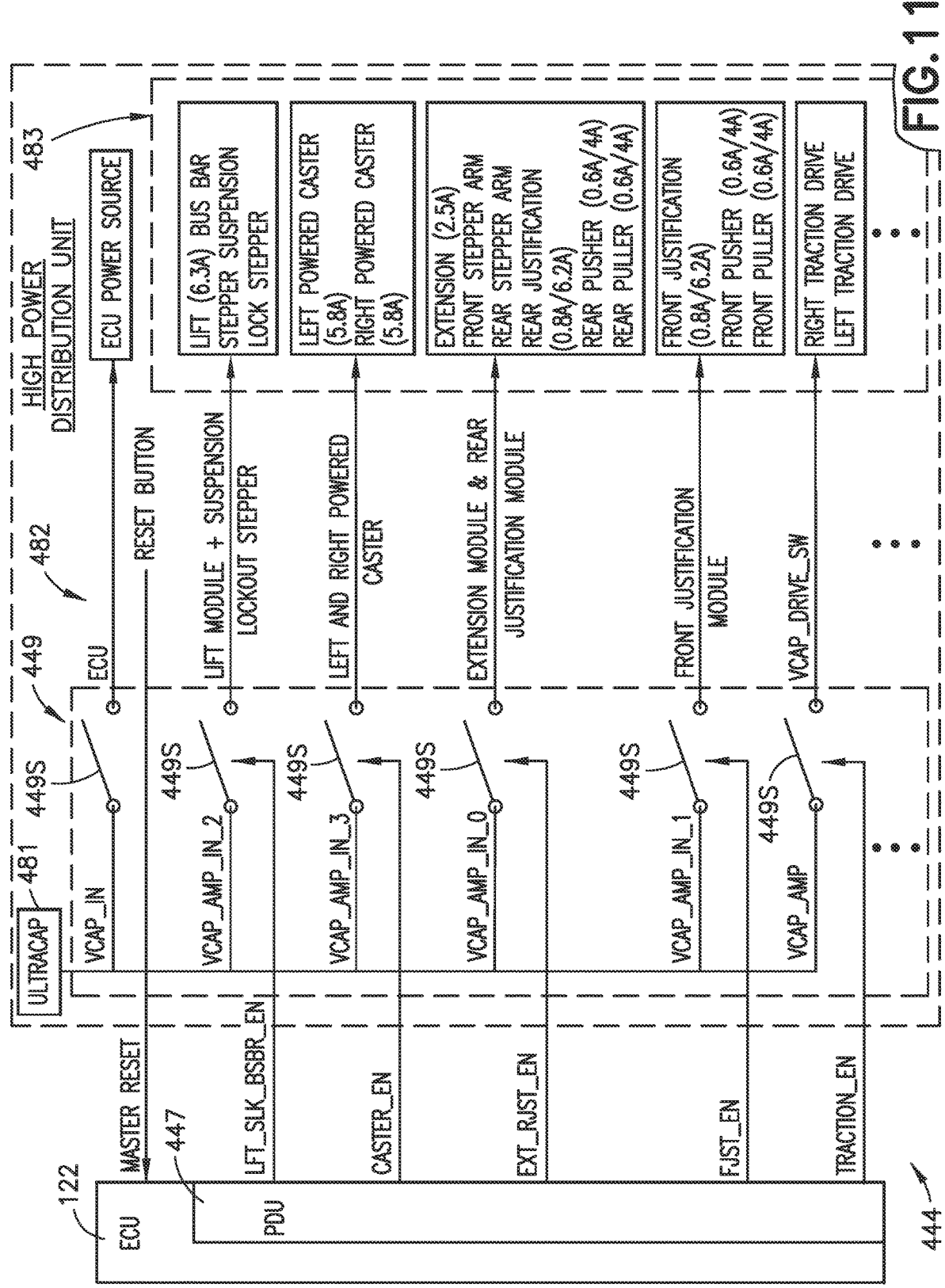
FIG. 11 is an exemplary schematic illustration of a portion of the control system of FIGS. 10A, 10B, and 10C in accordance with aspects of the disclosed embodiment.

Referring now to FIGS. 1A, 2, 4, 5, 6, and 9 and exemplary method for autonomous guided vehicle power management will be described in accordance with aspects of the disclosed embodiment. The method includes providing the autonomous transport 110 as described herein (FIG. 9, Block 900). Autonomous operation of the autonomous transport vehicle 110 is effected with the controller 122 (FIG. 9, Block 910) and a charge level of the power supply 481 of the autonomous transport vehicle 110 is monitored by the power distribution unit 444 (FIG. 9, Block 920) as described herein. The method may also include, as described herein, the switching of the branch power circuits 482 on and off in the predetermined pattern (such as described herein) based on the demand charge level of each respective branch power circuit 482 with respect to other branch power circuits 482 and the charge level available from the power supply 481 (FIG. 9, Block 930).

Upon indication from the power distribution section 444 of imminent decrease in available power supply charge level, directed from the power supply 481 to the branch circuit 482 of the drive section 261D (see FIG. 6) and/or the case handling assembly 210, the controller 122 commands the drive section 261D to move of the autonomous transport vehicle 110 to a safe location and/or commands the case handling assembly 210 to move the payload to a safe location (FIG. 9, Block 960) as described herein.

Upon indication from the power distribution unit 444 of imminent decrease in available power supply charge level, directed from the power supply 481 to the controller 122, to less than demand level of the controller 122, the controller 122 enters suspension of operation and hibernation (FIG. 9, Block 950) as described herein.

As also described herein, upon indication from the power distribution unit 444 of imminent decrease in available power supply charge level, directed from the power supply 481 to the controller 122, to less than demand level of the controller 122, the controller 122 creates at least one initialization file (FIG. 9, Block 940). As described herein, the controller 122 may configure at least one of the autonomous guided vehicle state and pose navigation information and the payload identity, state, and pose information, held in respective registry and memory (e.g., such as memory 446 or other memories 122M of corresponding ones of the autonomous navigation control section 122N, the autonomous payload handling control section 122H, and the vision system control section (e.g., vision system controller 122VC)) of corresponding controller sections, into an initialization file 122F available on reboot of the controller 122. The controller 122 may store health status information from the at least one of vehicle health status monitor 447V, the drive section health status monitor 447D, the payload handling section health monitor 447H, and the peripheral electronics section health monitor 447P in the health status register section 477M into the initialization file 122F (or a different initialization file) available on reboot of the controller 122.

In accordance with one or more aspects of the disclosed embodiment an autonomous guided vehicle comprises:

a vehicle chassis with a power supply mounted thereon and powered sections connected to the chassis and each powered by the power supply, the powered sections including:

a drive section with motors driving wheels, supporting the vehicle chassis, and disposed to traverse the autonomous guided vehicle on a traverse surface in a facility under autonomous guidance;

a payload handling section with at least one payload handling actuator configured so that actuation of the at least one payload handling actuator effects transfer of a payload to and from a payload bed, of the vehicle chassis, and a storage in the facility;

a peripheral electronics section having at least one of an autonomous pose and navigation sensor, at least one of a payload handling sensor, and at least one peripheral motor, the at least one peripheral motor being separate and distinct from each of the motors of the drive section and each actuator of the payload handling section; and a controller communicably coupled respectively to the drive section, the payload handling section, and peripheral section so at to effect each autonomous operation of the autonomous guided vehicle, wherein the controller comprises a comprehensive power management section communicably connected to the power supply so as to monitor a charge level of the power supply, and wherein the comprehensive power management section is connected to each respective branch circuit of the drive section, the payload handling section, and the peripheral electronics section respectively powering the drive section, the payload handling section, and the peripheral electronics section from the power supply, the comprehensive power management section being configured to manage power consumption of the branch circuits based on a demand level of each branch circuit relative to the charge level available from the power supply.

In accordance with one or more aspects of the disclosed embodiment the comprehensive power management section is configured so as to manage a demand charge level of each respective branch circuit switching each respective branch circuit on or off in a predetermined pattern based on the demand charge level of each respective branch circuit with respect to other branch circuits and the charge level available from the power supply.

In accordance with one or more aspects of the disclosed embodiment the predetermined pattern is arranged to switch off branch circuits with a decrease in the available charge level from the power supply, so as to maximize available charge level from the power supply directed to the controller.

In accordance with one or more aspects of the disclosed embodiment the predetermined pattern is arranged to switch off branch circuits with a decrease in the available charge level from the power supply so that the available charge level directed to the controller is equal to or exceeds the demand charge level of the controller for a maximum time based on the available charge level of the power supply.

In accordance with one or more aspects of the disclosed embodiment the controller has at least one of:

an autonomous navigation control section configured to register and hold in volatile memory autonomous guided vehicle state and pose navigation information, historic and current, that is deterministic of and describing current and predicted state, pose, and location of the autonomous guided vehicle; and an autonomous payload handling control section configured to register and hold in volatile memory current payload identity, state, and pose information, historic and current;

wherein the controller is configured so that upon indication from the comprehensive power management section of imminent decrease in available charge level, directed from the power supply to the controller, to less than demand level of the controller, the controller configures at least one of the autonomous guided vehicle state and pose navigation information and the payload identity, state, and pose information, held in respective registry and memory of corresponding controller sections, into an initialization file available on reboot of the controller.

In accordance with one or more aspects of the disclosed embodiment the controller is configured so that upon indication from the comprehensive power management section of imminent decrease in available charge level, directed from the power supply to the controller, to less than demand level of the controller, the controller enters suspension of operation and hibernation.

In accordance with one or more aspects of the disclosed embodiment the controller is configured so that upon indication from the comprehensive power management section of imminent decrease in available charge level, directed from the power supply to the branch circuit of the drive section, the controller is configured to command the drive section so as to navigate the autonomous guided vehicle along a predetermined auxiliary path and auxiliary trajectory (to a predetermined autonomous guided vehicle auxiliary stop location in the facility.

In accordance with one or more aspects of the disclosed embodiment the controller is configured so that upon indication from the comprehensive power management section of imminent decrease in available charge level, directed from the power supply to the branch circuit of the payload handling section the controller is configured to command the payload handling section to move the payload handling actuator, and any payload thereon, to a predetermined safe payload position in the payload bed.

In accordance with one or more aspects of the disclosed embodiment the controller includes at least one of:
 a vehicle health status monitor,
 a drive section health status monitor,
 a payload handling section health status monitor, and
 a peripheral electronics section health status monitor; and
 a health status register section; and
wherein the controller is configured so that upon indication from the comprehensive power management section of imminent decrease in available charge level, directed from the power supply to the controller, to less than demand level of the controller, to configure stored health status information from the at least one of the vehicle health status monitor, the drive section health status monitor, the payload handling section health monitor, and the peripheral electronics section health monitor in the health status register section into an initialization file available on reboot of the controller.

In accordance with one or more aspects of the disclosed embodiment the power supply is an ultra-capacitor, or the charge level is voltage level.

In accordance with one or more aspects of the disclosed embodiment method for autonomous guided vehicle power management is provided. The method comprises:
 providing an autonomous guided vehicle with a vehicle chassis with a power supply mounted thereon and powered sections connected to the chassis and each powered by the power supply, the powered sections including:

a drive section with motors driving wheels, supporting the vehicle chassis, and disposed to traverse the autonomous guided vehicle on a traverse surface in a facility under autonomous guidance;
 a payload handling section with at least one payload handling actuator configured so that actuation of the at least one payload handling actuator effects transfer of a payload to and from a payload bed, of the vehicle chassis, and a storage in the facility;
 a peripheral electronics section having at least one of an autonomous pose and navigation sensor, at least one of a payload handling sensor, and at least one peripheral motor, the at least one peripheral motor being separate and distinct from each of the motors of the drive section and each actuator of the payload handling section; and
 effecting, with a controller communicably coupled respectively to the drive section, the payload handling section, and peripheral section, each autonomous operation of the autonomous guided vehicle; and
 monitoring a charge level of the power supply with a comprehensive power management section of the controller, wherein the comprehensive power management section is connected to each respective branch circuit of the drive section, the payload handling section, and the peripheral electronics section respectively powering the drive section, the payload handling section, and the peripheral electronics section from the power supply, the comprehensive power management section manages power consumption of the branch circuits based on a demand level of each branch circuit relative to the charge level available from the power supply.

In accordance with one or more aspects of the disclosed embodiment the comprehensive power management section manages a demand charge level of each respective branch circuit switching each respective branch circuit on or off in a predetermined pattern based on the demand charge level of each respective branch circuit with respect to other branch circuits and the charge level available from the power supply.

In accordance with one or more aspects of the disclosed embodiment the predetermined pattern is arranged to switch off branch circuits with a decrease in the available charge level from the power supply, so as to maximize available charge level from the power supply directed to the controller.

In accordance with one or more aspects of the disclosed embodiment the predetermined pattern is arranged to switch off branch circuits with a decrease in the available charge level from the power supply so that the available charge level directed to the controller is equal to or exceeds the demand charge level of the controller for a maximum time based on the available charge level of the power supply.

In accordance with one or more aspects of the disclosed embodiment the method further comprises at least one of:
 with an autonomous navigation control section of the controller, registering and holding in volatile memory autonomous guided vehicle state and pose navigation information, historic and current, that is deterministic of and describing current and predicted state, pose, and location of the autonomous guided vehicle; and
 with an autonomous payload handling control section of the controller, registering and holding in volatile memory current payload identity, state, and pose information, historic and current;
wherein, upon indication from the comprehensive power management section of imminent decrease in available charge level, directed from the power supply to the controller, to less than demand level of the controller, the controller configures at least one of the autonomous guided vehicle state and pose navigation information and the payload identity, state, and pose information, held in respective registry and memory of corresponding controller sections, into an initialization file available on reboot of the controller.

In accordance with one or more aspects of the disclosed embodiment upon indication from the comprehensive power management section of imminent decrease in available charge level, directed from the power supply to the controller, to less than demand level of the controller, the controller enters suspension of operation and hibernation.

In accordance with one or more aspects of the disclosed embodiment upon indication from the comprehensive power management section of imminent decrease in available charge level, directed from the power supply to the branch circuit of the drive section, the controller commands the drive section so to navigate the autonomous guided vehicle along a predetermined auxiliary path and auxiliary trajectory to a predetermined autonomous guided vehicle auxiliary stop location in the facility.

In accordance with one or more aspects of the disclosed embodiment upon indication from the comprehensive power management section of imminent decrease in available charge level, directed from the power supply to the branch circuit of the payload handling section the controller commands the payload handling section to move the payload handling actuator, and any payload thereon, to a predetermined safe payload position in the payload bed.

In accordance with one or more aspects of the disclosed embodiment method of claim 11, further comprises:

providing the controller with at least one of a vehicle health status monitor, a drive section health status monitor, a payload handling section health status monitor, and a peripheral electronics section health status monitor; and a health status register section; and wherein, upon indication from the comprehensive power management section of imminent decrease in available charge level, directed from the power supply to the controller, to less than demand level of the controller, the controller configures stored health status information from the at least one of the vehicle health status monitor, the drive section health status monitor, the payload handling section health monitor, and the peripheral electronics section health monitor in the health status register section into an initialization file available on reboot of the controller.

In accordance with one or more aspects of the disclosed embodiment the power supply is an ultra-capacitor, or the charge level is voltage level.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An autonomous guided vehicle comprising:
a vehicle chassis with a power supply mounted thereon and powered sections connected to the chassis and each powered by the power supply, the powered sections including:
a drive section with motors driving wheels, supporting the vehicle chassis, and disposed to traverse the autonomous guided vehicle on a traverse surface in a facility under autonomous guidance;
a payload handling section with at least one payload handling actuator configured so that actuation of the at least one payload handling actuator effects transfer of a payload to and from a payload bed, of the vehicle chassis, and a storage in the facility;
a peripheral electronics section having at least one of an autonomous pose and navigation sensor, at least one of a payload handling sensor, and at least one peripheral motor, the at least one peripheral motor being separate and distinct from each of the motors of the drive section and each actuator of the payload handling section; and
a controller communicably coupled respectively to the drive section, the payload handling section, and peripheral electronics section so as to effect each autonomous operation of the autonomous guided vehicle, wherein the controller comprises a comprehensive power management section communicably connected to the power supply so as to monitor a charge level of the power supply, and
wherein the comprehensive power management section is connected to each respective branch circuit of the drive section, the payload handling section, and the peripheral electronics section respectively powering the drive section, the payload handling section, and the peripheral electronics section from the power supply, the comprehensive power management section being configured to manage power consumption of the branch circuits based on a demand level of each branch circuit relative to the charge level available from the power supply.

2. The autonomous guided vehicle of claim 1, wherein the comprehensive power management section is configured so as to manage a demand charge level of each respective branch circuit by switching each respective branch circuit on or off in a predetermined pattern based on the demand charge level of each respective branch circuit with respect to other branch circuits and the charge level available from the power supply.

3. The autonomous guided vehicle of claim 1, wherein the predetermined pattern is arranged to switch off branch circuits with a decrease in the charge level available from the power supply, so as to maximize the charge level available from the power supply directed to the controller.

4. The autonomous guided vehicle of claim 1, wherein the predetermined pattern is arranged to switch off branch circuits with a decrease in the charge level available from the power supply so that the charge level available directed to the controller is equal to or exceeds the demand charge level of the controller for a maximum time based on the charge level available of the power supply.

5. The autonomous guided vehicle of claim 1, wherein the controller has at least one of:
an autonomous navigation control section configured to register and hold in volatile memory autonomous guided vehicle state and pose navigation information, historic and current, that is deterministic of and describing current and predicted state, pose, and location of the autonomous guided vehicle; and an autonomous payload handling control section configured to register and hold in volatile memory current payload identity, state, and pose information, historic and current;

wherein the controller is configured so that upon indication from the comprehensive power management section of imminent decrease in available charge level, directed from the power supply to the controller, to less than the demand level of the controller, the controller configures at least one of the autonomous guided vehicle state and pose navigation information and the payload identity, state, and pose information, held in respective registry and memory of corresponding controller sections, into an initialization file available on reboot of the controller.

6. The autonomous guided vehicle of claim 1, wherein the controller is configured so that upon indication from the comprehensive power management section of imminent decrease in available charge level, directed from the power supply to the controller, to less than the demand level of the controller, the controller enters suspension of operation and hibernation.

7. The autonomous guided vehicle of claim 1, wherein the controller is configured so that upon indication from the comprehensive power management section of imminent decrease in available charge level, directed from the power supply to the branch circuit of the drive section, the controller is configured to command the drive section so as to navigate the autonomous guided vehicle along a predetermined auxiliary path and auxiliary trajectory to a predetermined autonomous guided vehicle auxiliary stop location in the facility.

8. The autonomous guided vehicle of claim 1, wherein the controller is configured so that upon indication from the comprehensive power management section of imminent decrease in available charge level, directed from the power supply to the branch circuit of the payload handling section the controller is configured to command the payload handling section to move the payload handling actuator, and any payload thereon, to a predetermined safe payload position in the payload bed.

9. The autonomous guided vehicle of claim 1, wherein the controller includes at least one of:
  a vehicle health status monitor,
  a drive section health status monitor,
  a payload handling section health status monitor, and
  a peripheral electronics section health status monitor; and
  a health status register section; and
wherein the controller is configured so that upon indication from the comprehensive power management section of imminent decrease in available charge level, directed from the power supply to the controller, to less than the demand level of the controller, to configure stored health status information from the at least one of the vehicle health status monitor, the drive section health status monitor, the payload handling section health monitor, and the peripheral electronics section health monitor in the health status register section into an initialization file available on reboot of the controller.

10. The autonomous guided vehicle of claim 1, wherein the power supply is an ultra-capacitor, or the charge level is voltage level.

11. A method for autonomous guided vehicle power management, the method comprising:
  providing an autonomous guided vehicle with a vehicle chassis with a power supply mounted thereon and powered sections connected to the chassis and each powered by the power supply, the powered sections including:
    a drive section with motors driving wheels, supporting the vehicle chassis, and disposed to traverse the autonomous guided vehicle on a traverse surface in a facility under autonomous guidance;
    a payload handling section with at least one payload handling actuator configured so that actuation of the at least one payload handling actuator effects transfer of a payload to and from a payload bed, of the vehicle chassis, and a storage in the facility;
    a peripheral electronics section having at least one of an autonomous pose and navigation sensor, at least one of a payload handling sensor, and at least one peripheral motor, the at least one peripheral motor being separate and distinct from each of the motors of the drive section and each actuator of the payload handling section; and
  effecting, with a controller communicably coupled respectively to the drive section, the payload handling section, and peripheral electronics section, each autonomous operation of the autonomous guided vehicle; and
  monitoring a charge level of the power supply with a comprehensive power management section of the controller, wherein the comprehensive power management section is connected to each respective branch circuit of the drive section, the payload handling section, and the peripheral electronics section respectively powering the drive section, the payload handling section, and the peripheral electronics section from the power supply, the comprehensive power management section manages power consumption of the branch circuits based on a demand level of each branch circuit relative to the charge level available from the power supply.

12. The method of claim 11, wherein the comprehensive power management section manages a demand charge level of each respective branch circuit switching each respective branch circuit on or off in a predetermined pattern based on the demand charge level of each respective branch circuit with respect to other branch circuits and the charge level available from the power supply.

13. The method of claim 11, wherein the predetermined pattern is arranged to switch off branch circuits with a decrease in the charge level available from the power supply, so as to maximize the charge level available from the power supply directed to the controller.

14. The method of claim 11, wherein the predetermined pattern is arranged to switch off branch circuits with a decrease in the charge level available from the power supply so that the charge level available directed to the controller is equal to or exceeds the demand charge level of the controller for a maximum time based on the charge level available of the power supply.

15. The method of claim 11, further comprising at least one of:
  with an autonomous navigation control section of the controller, registering and holding in volatile memory autonomous guided vehicle state and pose navigation information, historic and current, that is deterministic of and describing current and predicted state, pose, and location of the autonomous guided vehicle; and
  with an autonomous payload handling control section of the controller, registering and holding in volatile memory current payload identity, state, and pose information, historic and current;

wherein, upon indication from the comprehensive power management section of imminent decrease in available charge level, directed from the power supply to the controller, to less than the demand level of the controller, the controller configures at least one of the autonomous guided vehicle state and pose navigation information and the payload identity, state, and pose information, held in respective registry and memory of corresponding controller sections, into an initialization file available on reboot of the controller.

16. The method of claim 11, wherein upon indication from the comprehensive power management section of imminent decrease in available charge level, directed from the power supply to the controller, to less than the demand level of the controller, the controller enters suspension of operation and hibernation.

17. The method of claim 11, wherein upon indication from the comprehensive power management section of imminent decrease in available charge level, directed from the power supply to the branch circuit of the drive section, the controller commands the drive section so to navigate the autonomous guided vehicle along a predetermined auxiliary path and auxiliary trajectory to a predetermined autonomous guided vehicle auxiliary stop location in the facility.

18. The method of claim 11, wherein upon indication from the comprehensive power management section of imminent decrease in available charge level, directed from the power supply to the branch circuit of the payload handling section the controller commands the payload handling section to move the payload handling actuator, and any payload thereon, to a predetermined safe payload position in the payload bed.

19. The method of claim 11, further comprising:
providing the controller with at least one of
a vehicle health status monitor,
a drive section health status monitor,
a payload handling section health status monitor, and
a peripheral electronics section health status monitor; and
a health status register section; and
wherein, upon indication from the comprehensive power management section of imminent decrease in available charge level, directed from the power supply to the controller, to less than the demand level of the controller, the controller configures stored health status information from the at least one of the vehicle health status monitor, the drive section health status monitor, the payload handling section health monitor, and the peripheral electronics section health monitor in the health status register section into an initialization file available on reboot of the controller.

20. The autonomous guided vehicle of claim 11, wherein the power supply is an ultra-capacitor, or the charge level is voltage level.

* * * * *